US011616784B2

(12) United States Patent
Kwatra et al.

(10) Patent No.: US 11,616,784 B2
(45) Date of Patent: Mar. 28, 2023

(54) PERSONAL-PUBLIC SERVICE SET IDENTIFIERS CONNECTION IMPLEMENTED BY A WAP

(71) Applicant: KYNDRYL, INC., New York, NY (US)

(72) Inventors: Shikhar Kwatra, Durham, NC (US); Seng Chai Gan, Ashburn, VA (US); Charles Kenneth Flack, Marietta, GA (US); Adam Lee Griffin, Dubuque, IA (US)

(73) Assignee: Kyndryl, Inc., New York, NY (US)

( * ) Notice: Subject to any disclaimer, the term of this patent is extended or adjusted under 35 U.S.C. 154(b) by 429 days.

(21) Appl. No.: 16/508,375

(22) Filed: Jul. 11, 2019

(65) Prior Publication Data

US 2021/0014234 A1 Jan. 14, 2021

(51) Int. Cl.
*H04L 29/06* (2006.01)
*H04L 29/08* (2006.01)
(Continued)

(52) U.S. Cl.
CPC ........ *H04L 63/102* (2013.01); *H04L 63/0861* (2013.01); *H04W 4/021* (2013.01);
(Continued)

(58) Field of Classification Search
CPC ... H04L 67/30; H04L 63/102; H04L 63/0861; H04L 63/083; H04W 12/50;
(Continued)

(56) References Cited

U.S. PATENT DOCUMENTS

| 7,509,131 B2 | 3/2009 | Krumm et al. |
| 8,194,589 B2 | 6/2012 | Wynn et al. |

(Continued)

FOREIGN PATENT DOCUMENTS

| CN | 103858097 A | 6/2014 |
| CN | 104852894 A | 8/2015 |

(Continued)

OTHER PUBLICATIONS

Notification of Transmittal of the International Search Report and the Written Opinion of the International Searching Authority, or the Declaration, dated Nov. 3, 2020, 7 pages.
(Continued)

*Primary Examiner* — Haresh N Patel
(74) *Attorney, Agent, or Firm* — Erik Swanson; Andrew M. Calderon; Calderon Safran & Cole, P.C.

(57) ABSTRACT

Embodiments are directed to techniques for secure network connectivity. The techniques including a system having a credential server storing a Personal-Public (PP) Service Set Identifier (SSID) profile configured according to registration information provided from a personal computing device. The system further including a Wireless Access Point (WAP) communicatively coupled to the credential server and configured to implement a PP SSID connection using the PP SSID profile to create a single-device, single-use, password-protected, unadvertised, and encrypted networking channel between the personal computing device and the Internet.

20 Claims, 12 Drawing Sheets

(51) Int. Cl.
*H04L 9/40* (2022.01)
*H04W 4/021* (2018.01)
*H04W 48/20* (2009.01)
*H04W 76/11* (2018.01)
*H04W 76/38* (2018.01)

(52) U.S. Cl.
CPC ............ *H04W 48/20* (2013.01); *H04W 76/11* (2018.02); *H04W 76/38* (2018.02)

(58) Field of Classification Search
CPC ..... H04W 76/11; H04W 76/38; H04W 12/61; H04W 12/64; H04W 4/025; H04W 76/12; H04W 4/021; H04W 48/20; H04W 48/16; H04W 84/12
USPC .............................................................. 726/4
See application file for complete search history.

(56) References Cited

U.S. PATENT DOCUMENTS

| | | | |
|---|---|---|---|
| 8,358,638 B2 | 1/2013 | Scherzer et al. | |
| 8,463,295 B1* | 6/2013 | Caralis | H04W 4/021 455/456.3 |
| 9,137,735 B2 | 9/2015 | Thomas et al. | |
| 9,286,266 B1* | 3/2016 | Fleck | H04W 4/029 |
| 9,998,982 B2 | 6/2018 | Horn et al. | |
| 10,417,846 B1 | 9/2019 | Smith | G07C 9/00571 |
| 2008/0137860 A1 | 6/2008 | Silvernail | |
| 2014/0066101 A1* | 3/2014 | Lyman | H04W 4/021 455/456.3 |
| 2014/0075523 A1 | 3/2014 | Tuomaala et al. | |
| 2014/0164118 A1* | 6/2014 | Polachi | G06Q 30/0259 705/14.57 |
| 2014/0337123 A1* | 11/2014 | Nuernberg | H04W 4/021 705/14.45 |
| 2015/0269624 A1* | 9/2015 | Cheng | G06Q 30/0267 705/14.58 |
| 2016/0125519 A1* | 5/2016 | Sundaresan | H04L 67/18 705/26.3 |
| 2016/0180703 A1* | 6/2016 | Chang | G09B 21/003 340/944 |
| 2016/0295546 A1* | 10/2016 | Yumura | H04W 4/029 |
| 2017/0034215 A1* | 2/2017 | Sigel | H04L 63/108 |
| 2017/0318418 A1* | 11/2017 | Alizadeh-Shabdiz | H04L 67/30 |
| 2018/0035248 A1* | 2/2018 | Soave | H04W 4/025 |
| 2018/0176763 A1* | 6/2018 | Joarder | H04W 76/11 |
| 2018/0227959 A1* | 8/2018 | Fraccaroli | H04W 76/14 |
| 2018/0234848 A1* | 8/2018 | Cohen | H04L 61/5038 |
| 2018/0310123 A1* | 10/2018 | Deluca | H04W 4/027 |
| 2018/0338031 A1* | 11/2018 | Subramanian | H04L 67/22 |
| 2018/0376448 A1* | 12/2018 | Wild | H04W 64/00 |
| 2019/0014532 A1* | 1/2019 | Bradish | H04W 48/12 |
| 2019/0287377 A1* | 9/2019 | Gillum | G08B 21/0275 |
| 2019/0372838 A1* | 12/2019 | Travostino | H04L 41/0813 |
| 2020/0168014 A1* | 5/2020 | Uliyar | H04N 5/23245 |
| 2020/0236619 A1* | 7/2020 | Baird | H04W 4/029 |
| 2020/0252399 A1* | 8/2020 | Hancock | H04L 63/029 |

FOREIGN PATENT DOCUMENTS

| | | | | |
|---|---|---|---|---|
| CN | 105830414 A | | 8/2016 | |
| CN | 104798430 B | | 9/2018 | |
| JP | 2017188951 A | * | 10/2017 | ........... G06F 3/1204 |
| JP | 2020098456 A | * | 6/2020 | |
| JP | 2020137004 A | * | 8/2020 | |
| JP | 6853742 B2 | * | 3/2021 | ........... G06F 3/1204 |
| WO | WO-2018118150 A1 | * | 6/2018 | ......... H04L 63/0823 |

OTHER PUBLICATIONS

Symantec, "Norton Wi-Fi Risk Report—Report of Online Survey Results in 15 Global Markets", 20 pages, https://www.symantec.com/content/dam/symantec/docs/reports/2017-norton-wifi-risk-report-global-results-summary-en.pdf, 2017.

Windows, "How to find and connect to Hidden WiFi Networks on Windows 10", Posted by LavishT@TWC on Jan. 14, 2018, printed Mar. 20, 2019, 6 pages, https://www.thewindowsclub.com/hidden-wi-fi-networks.

Cache et al., "Hacking Exposed Wireless: Wireless Security Secrets and Solutions", Second Edition, Copyright © 2010, 484 pages.

Anonymous, "Method for automatic redirection from open to protected public wireless networks", An IP.com Prior Art Database Technical Disclosure, IP.com No. IPCOM000228195D, IP.com Electronic Publication Date: Jun. 12, 2013, 5 pages.

IBM, "End to End WTLS Security Model for WAP", An IP.com Prior Art Database Technical Disclosure, IP.com No. IPCOM000016778D, IP.com Electronic Publication Date: Jul. 15, 2003, 11 pages.

Mell et al., "The NIST Definition of Cloud Computing", Recommendations of the National Institute of Standards and Technology, Sep. 2011, 7 pages.

* cited by examiner

PERSONAL-PUBLIC SERVICE SET IDENTIFIERS CONNECTION IMPLEMENTED BY A WAP

BACKGROUND

The present disclosure relates to networks, and, more specifically, to network security. Service Set Identifiers (SSIDs) are unique identifiers (e.g., 32 characters, 32 bytes, etc.) that are used to identify wireless (e.g., Wi-Fi®) networks. In some instances, multiple wireless networks overlap a single geographical area. In these situations, SSIDs are used to ensure data is transmitted over the appropriate Wi-Fi connection. SSID broadcasting is used to notify users of available SSIDs. SSID broadcasting includes the continuous transmission of packets from a Wi-Fi access point.

Unauthorized access to a SSID jeopardizes security for other user devices connected to the SSID. For example, a malicious user with unauthorized access to the SSID can intercept network traffic from other users. Intercepted network traffic can include sensitive, private, personal, or otherwise confidential information which may be used by a malicious actor for fraudulent purposes. Thus, there is a need to utilize security protocols with SSIDs to promote network security.

Various levels of security are associated with SSIDs. As one example, some SSIDs are password protected to promote network security. In these situations, although the SSID is publicly visible, a password is required to access the associated Wi-Fi network. One weakness associated with password protected SSIDs is that publicly visible SSIDs with conventional, alphanumeric password protection are susceptible to compromise by brute force attacks, phishing attacks, and/or other attacks.

As another example, some SSIDs are hidden to promote network security. In these situations, the SSID is not broadcast and thus is not publicly visible when a user device is searching for a Wi-Fi access point. Instead, a user manually enters the SSID in order to access the hidden Wi-Fi network. One weakness associated with hidden SSIDs is that a hidden SSID can be discovered by intercepting data packet transmissions using simple traffic monitoring software.

Thus, there is a technical challenge associated with network security that stems from the public nature of current SSID technology, where the current SSID technology is configured to enable multiple devices to access a network using a common SSID.

SUMMARY

Aspects of the present disclosure are directed toward a system comprising a credential server storing a Personal-Public (PP) Service Set Identifier (SSID) profile configured according to registration information provided from a personal computing device. The system further comprises a Wireless Access Point (WAP) communicatively coupled to the credential server and configured to implement a PP SSID connection using the PP SSID profile to create a single-device, single-use, password-protected, unadvertised, and encrypted networking channel between the personal computing device and an Internet.

Advantageously, the aforementioned system improves network security by implementing a PP SSID connection that is a single-device, single-use, password-protected, unadvertised, and encrypted networking channel. A single-device networking channel limits the ability of a malicious device to connect to the PP SSID connection. A single-use networking channel limits the amount of time that the PP SSID connection is susceptible to intrusion by a malicious actor. A password-protected PP SSID connection provides an additional layer of security associated with the PP SSID connection. An unadvertised PP SSID connection makes the PP SSID connection difficult to discover by a malicious actor. An encrypted PP SSID connection makes any intercepted data from the PP SSID connection of little or no value.

Another optional aspect of the present disclosure that includes the limitations presented in the system above further includes that the PP SSID profile is associated with an expiration, where the PP SSID connection is configured to be terminated according to the expiration, and where the expiration is selected from a group consisting of: a time, an amount of usage, and a type of usage.

The aforementioned optional aspect of the present disclosure advantageously promotes network security and improves computational efficiency. For example, the aforementioned optional aspect promotes network security by terminating the PP SSID connection according to a time-based or usage-based expiration in order to limit the lifespan of the PP SSID connection. Limiting the lifespan of the PP SSID connection reduces the ability of a malicious actor to compromise the PP SSID connection by introducing time pressure. Furthermore, the aforementioned optional aspect of the present disclosure improves computational efficiency by limiting the lifespan of the PP SSID connection so that the PP SSID connection is not unnecessarily maintained beyond a time-based or a usage-based expiration.

Another optional aspect of the present disclosure that includes the limitations presented in the system above further includes that the PP SSID profile is associated with an expiration, where the PP SSID connection is configured to be terminated according to the expiration, where the expiration is based on a location of the personal computing device and a geofence defined in the PP SSID profile, and where the PP SSID connection is terminated when the personal computing device is outside of the geofence.

The aforementioned optional aspect of the present disclosure advantageously promotes network security and improves computational efficiency by terminating the PP SSID connection according to a location-based expiration. A location-based expiration can increase security by terminating the PP SSID connection outside of a predefined safe usage area (e.g., an area protected against eavesdropping, snooping, etc) Likewise, the location-based expiration improves computational efficiency by preventing maintenance of PP SSID connections beyond a location-based expiration.

Further aspects of the present disclosure are directed to a computer-implemented method comprising receiving, at a credential server and from a Wireless Access Point (WAP), registration information from a personal computing device in response to the personal computing device connecting to a publicly advertised Service Set Identifier (SSID) provided by the WAP. The method further comprises configuring, by the credential server, a Personal-Public (PP) SSID profile based on the registration information. The method further comprises providing a PP SSID network name and PP SSID password of the PP SSID profile to the personal computing device via the WAP, where the PP SSID profile enables the personal computing device to establish a PP SSID connection comprising a single-device, single-use, password-protected, unadvertised, and encrypted networking channel between the personal computing device and an Internet. Additional aspects of the present disclosure are directed to systems and computer program products configured to perform the aforementioned computer-implemented method.

Advantageously, the aforementioned method improves network security by implementing a PP SSID connection that is a single-device, single-use, password-protected, unadvertised, and encrypted networking channel. A single-device networking channel limits the ability of a malicious device to connect to the PP SSID connection. A single-use networking channel limits the amount of time that the PP SSID connection is susceptible to intrusion by a malicious actor. A password-protected PP SSID connection provides an additional layer of security associated with the PP SSID connection. An unadvertised PP SSID connection makes the PP SSID connection difficult to discover by a malicious actor. An encrypted PP SSID connection makes any intercepted from the PP SSID connection of little or no value.

Another optional aspect of the present disclosure including the limitations of the method described above further includes configuring the Personal-Public (PP) SSID profile based on the registration information by generating a predicted time of a PP SSID request associated with the personal computing device, where providing the PP SSID network name and PP SSID password of the PP SSID profile to the personal computing device occurs within an interval of time before the predicted time.

The aforementioned optional aspect of the present disclosure advantageously improves usability and efficiency by predictively provisioning the PP SSID connection.

Further aspects of the present disclosure are directed to a computer-implemented method comprising connecting a personal computing device to a publicly advertised service set identifier (SSID). The method further comprises providing registration information to an authentication webpage in response to connecting to the publicly advertised SSID. The method further comprises receiving a Personal-Public (PP) SSID network name and a PP SSID password in response to providing registration information to the authentication webpage. The method further comprises accessing an Internet using a PP SSID connection by establishing a single-device, single-use, password-protected, unadvertised, and encrypted networking channel between the personal computing device and the Internet. Additional aspects of the present disclosure are directed to systems and computer program products configured to perform the aforementioned computer-implemented method.

Advantageously, the aforementioned method improves network security by implementing a PP SSID connection that is a single-device, single-use, password-protected, unadvertised, and encrypted networking channel. A single-device networking channel limits the ability of a malicious device to connect to the PP SSID connection. A single-use networking channel limits the amount of time that the PP SSID connection is susceptible to intrusion by a malicious actor. A password-protected PP SSID connection provides an additional layer of security associated with the PP SSID connection. An unadvertised PP SSID connection makes the PP SSID connection difficult to discover by a malicious actor. An encrypted PP SSID connection makes any intercepted data from the PP SSID connection of little or no value.

An additional optional aspect of the present disclosure including the limitations of the aforementioned method includes the PP SSID password comprising a biometric password selected from a group consisting of: a voice-based password, a face-based password, a fingerprint-based password, and a gait-based password.

Advantageously, a biometric password can be more difficult to falsify by a malicious actor than a traditional password. Thus, the aforementioned optional aspect of the present disclosure further improves network security.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
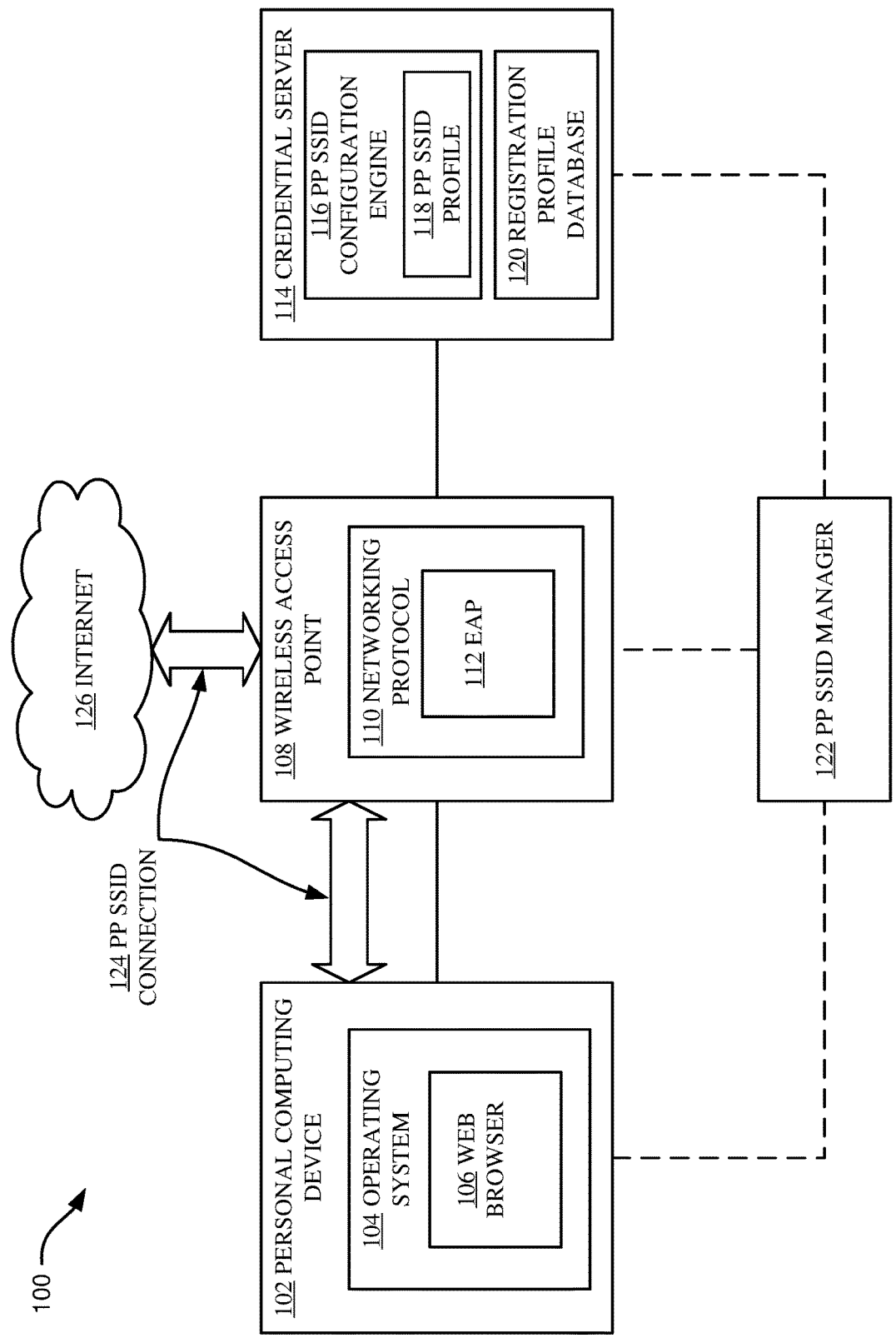
FIG. 1 illustrates a diagram of an example computing environment for generating and utilizing Personal-Public (PP) service set identifiers (SSIDs), in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward networks, and, more specifically, to network security. While not limited to such applications, embodiments of the present disclosure may be better understood in light of the aforementioned context.

Referring now to FIG. 1, illustrated is a block diagram of an example computing environment 100 for implementing Personal-Public (PP) Service Set Identifiers (SSIDs), in accordance with some embodiments of the present disclosure.

First, a brief discussion of PP SSIDs: PP SSIDs can be used for generating secure networking channels between a user device and a network (e.g., the Internet, an intranet, or a different network). The PP SSID networking channels can be one or more of: single-device, single-use, password-protected, unadvertised, encrypted, and/or provisioned. PP SSIDs are thus "public" in the sense that they are provided by publicly available Wireless Access Points (WAPs) such as WAP 108 and "personal" in the sense that each PP SSID is configured to provide secure network access for a single device such as personal computing device 102.

Returning to the discussion of FIG. 1, the computing environment 100 includes a personal computing device 102, a wireless access point (WAP) 108, a credential server 114, and a PP SSID manager 122 that are directly or indirectly communicatively coupled to one another by physical, wireless, or a combination of physical and wireless networking protocols.

Personal computing device 102 can be, but is not limited to, a computer, a desktop, a laptop, a tablet, a smartphone, a mobile phone, a smart device (e.g., smart glasses, smart appliances, smart television, etc.), or a different device. Personal computing device 102 is configured to execute an operating system 104 capable of presenting a web browser 106 application, where the web browser 106 can be utilized as an interface for communicating with the Internet 126 via the WAP 108. Although a single personal computing device 102 is shown utilizing PP SSID connection 124, in some embodiments there can be multiple computing devices 102 utilizing PP SSID connection 124 (e.g., a predefined group, set, or cohort of devices). These embodiments can be useful when, for example, a single user is accessing the Internet 126 using a smartphone and a tablet and a laptop. In such an embodiment, each of the smartphone, tablet, and laptop belonging to a same user could utilize a same PP SSID connection 124. As another example, a group of similar users in a similar location could share a PP SSID connection 124. In such an example, the group of similar users could be employees of a same company working together on a business trip. Nonetheless, for ease of discussion, the remainder of the disclosure will discuss a single personal computing device 102.

WAP 108 can be any configuration of hardware and software useful for wirelessly connecting a device (e.g., personal computing device 102) to a network (e.g., Internet 126). WAP 108 can include, for example, a router, an access point, a hotspot, and so on. In some embodiments, WAP 108 can be physically connected to the Internet 126 (e.g., via an Ethernet connection) and capable of providing wireless access to the Internet 126 using one or more wireless networking protocols 110. Networking protocol 110 can be, but is not limited to, the Institute of Electrical and Electronic Engineers (IEEE) networking protocol 802.1X-2010, published Feb. 5, 2010, as amended by 802.1Xbx-2014, published Dec. 22, 2014 and 802.1Xck-2018, published Dec. 21, 2018, which is an IEEE Standard for port-based Network Access Control (PNAC). Networking protocol 110 can be configured for Extensible Authentication Protocol (EAP) 112 which is an authentication framework that can be used in wireless networks and/or point-to-point connections. EAP 112 is a standard defined according to Request for Comments (RFC) 3748 and updated by RFC 5247. As will be appreciated by one skilled in the art, EAP 112 is one example of an authentication protocol and other types of authentication protocols, if any, can be used in other embodiments.

Credential server 114 can be any configuration of hardware and software useful for configuring, generating, storing, and/or transmitting a PP SSID profile 118 to personal computing device 102 via WAP 108 for establishing a corresponding PP SSID connection 124. Credential server 114 can also monitor PP SSID profile 118 for expiration, and, upon expiration of the PP SSID profile 118, issue a self-destruction command to perform one or more of deleting the expired PP SSID profile 118 and/or terminating the corresponding PP SSID connection 124.

Credential server 114 can contain a PP SSID configuration engine 116 configured to generate customized, tailored, and/or otherwise individualized PP SSID profiles for individual devices such as PP SSID profile 118 for personal computing device 102. PP SSID configuration engine 116 can utilize, for example, machine learning, artificial intelligence, deep learning, neural networks, and the like to generate PP SSID profile 118. PP SSID profile 118 can include, but is not limited to, a PP SSID network name, a PP SSID password, a PP SSID encryption protocol, a PP SSID authentication protocol, a time-based expiration (e.g., a time, a duration, etc.), a usage-based expiration (e.g., an amount of usage, a type of usage, etc.), and/or a location-based expiration (e.g., a geofence).

Credential server 114 can further contain registration profile database 120 for storing registration profiles of various devices such as personal computing device 102. Registration profiles in registration profile database 120 can include, for example, sign-in names, usernames, personal identifiers, passwords, usage history, and so on. Information in registration profile database 120 can be used by PP SSID configuration engine 116 to generate PP SSID profile 118.

PP SSID manager 122 can be any configuration of hardware and software useful for managing PP SSID functionality at one or more of personal computing device 102, WAP 108, and/or credential server 114. PP SSID functionality can include generation, storage, transmission, or deletion of PP SSID profile 118 and/or implementation or termination of PP SSID connection 124. PP SSID manager 122 can include hardware and/or software communicatively coupled to, embedded within, or distributed between, one or more of personal computing device 102, WAP 108, and/or credential server 114. As one example, PP SSID manager 122 can be an application executing on personal computing device 102. As another example PP SSID manager 122 can be processor-executable code stored in a tangible storage medium of WAP 108 and/or credential server 114. As another example, PP SSID manager 122 can be a cloud-based application capable of provisioning PP SSID functionality to one or more of personal computing device 102, WAP 108, and/or credential server 114 on an as-needed basis.

PP SSID manager 122 can be useful for establishing a PP SSID connection 124 between personal computing device 102 and the Internet 126 via WAP 108. PP SSID connection 124 can include one or more of the following characteristics:

(i) Single-Device: the PP SSID connection 124 can be customized according to the PP SSID profile 118 associated with the one and only one personal computing device 102, where the customization can relate to, among other things, a usage amount, a usage type, a usage time, a usage location (e.g., geofence), a predicted future usage, and the like. The "Single-Device" characteristic has a first advantage of tailorability, where the tailorability improves usability and efficiency by tailoring PP SSID connection 124 to the probable usage of the personal computing device 102. The "Single-Device" characteristic has a second advantage of improved security, where the improved security relates to discoverability of malicious behavior on PP SSID connection 124 by identifying multiple device connection attempts where only a single device connection is authorized. In some embodiments, however, PP SSID connection 124 is configured for a set of devices rather than a single device, where the set of devices belong to a predefined group (e.g., employees of a certain company, guests of a certain hotel, etc.).

(ii) Single-Use: the PP SSID connection 124 can be associated with an expiration, where the expiration is based on, for example, location (e.g., within or outside of a geofence), date and/or time, time of usage, type of usage, amount of usage, and the like. The "Single-Use" characteristic of PP SSID connection 124 advantageously improves security by terminating PP SSID connection 124 and generating a new PP SSID connection 124 for new sessions even with the same personal computing device 102. Thus, if a malicious attacker discovers a PP SSID connection 124, the malicious attacker has a limited (and likely inadequate) amount of time to attempt to compromise the PP SSID connection 124 before it is terminated and a new PP SSID session is created.

(iii) Password-Protected: the PP SSID connection 124 can be secured by, for example, an authentication protocol utilizing a password based on the PP SSID profile 118 of the personal computing device 102. The "Password-Protected" characteristic of the PP SSID connection 124 improves security by decreasing the likelihood that the PP SSID connection 124 is compromised even if the PP SSID network name is discovered. In addition, two-factor authentication, one-time passwords, biometric passwords, and other password-related security mechanisms can be used to further increase the security of PP SSID connection 124 compared to conventional passwords.

(iv) Unadvertised: the PP SSID connection 124 can include an unadvertised (e.g., hidden, cloaked, etc.) PP SSID network name so that only the personal computing device 102 associated with the PP SSID profile 118 corresponding to the PP SSID connection 124 is aware of the PP SSID network name. The "Unadvertised" characteristic advantageously improves security by limiting the ability of a malicious actor to find or identify the PP SSID connection 124.

(v) Encrypted: the PP SSID connection 124 can be further secured by, for example, an encryption protocol. The "Encrypted" characteristic of PP SSID connection 124 improves network security by encrypting data transmitted between personal computing device 102 and the internet 126 via WAP 108. As a result, even if the data is intercepted, the intercepted data is encrypted and has limited, if any, value to a malicious attacker.

(vi) Provisioned: the PP SSID connection 124 can be provisioned to personal computing device 102 where the personal computing device 102 or a login entered into the personal computing device 102 (e.g., an employee ID) is associated with a contract for PP SSID provisioning. In these embodiments, the contract for PP SSID provisioning can be for individual PP SSID provisioning (e.g., an individual at a restaurant desiring PP SSID secure network connectivity), for provisioning of numerous individual PP SSIDs (e.g., a company with employees distributed around a region or country), and/or other arrangements whereby PP SSID manager 122 provisions PP SSID functionality to one or more personal computing devices 102 in accordance with previously arranged functionality terms, duration terms, payment terms, usage terms, and/or other terms of the PP SSID provisioning. Advantageously, the "Provisioned" characteristic of PP SSID connection 124 enables, as-needed, metered usage of PP SSID functionality.

Thus, aspects of the present disclosure are generally directed to creating, implementing, and/or utilizing a PP SSID connection 124 based on a PP SSID profile 118 using a personal computing device 102, a WAP 108, and a credential server 114, where the PP SSID connection 124 can be configured to provide one or more of the characteristics of: single-device, single-use, password-protected, encrypted, and/or provisioned for the purpose of improving network security.

The aforementioned block diagram can include more components, fewer components, and/or different components than the components explicitly shown while remaining within the spirit and scope of the present disclosure. Likewise, the components shown in the block diagram can be separated from one another, combined with one another, integrated within one another, and/or otherwise communicatively coupled together in other arrangements than the arrangement shown in FIG. 1 while remaining within the spirit and scope of the present disclosure.

Figure 2:
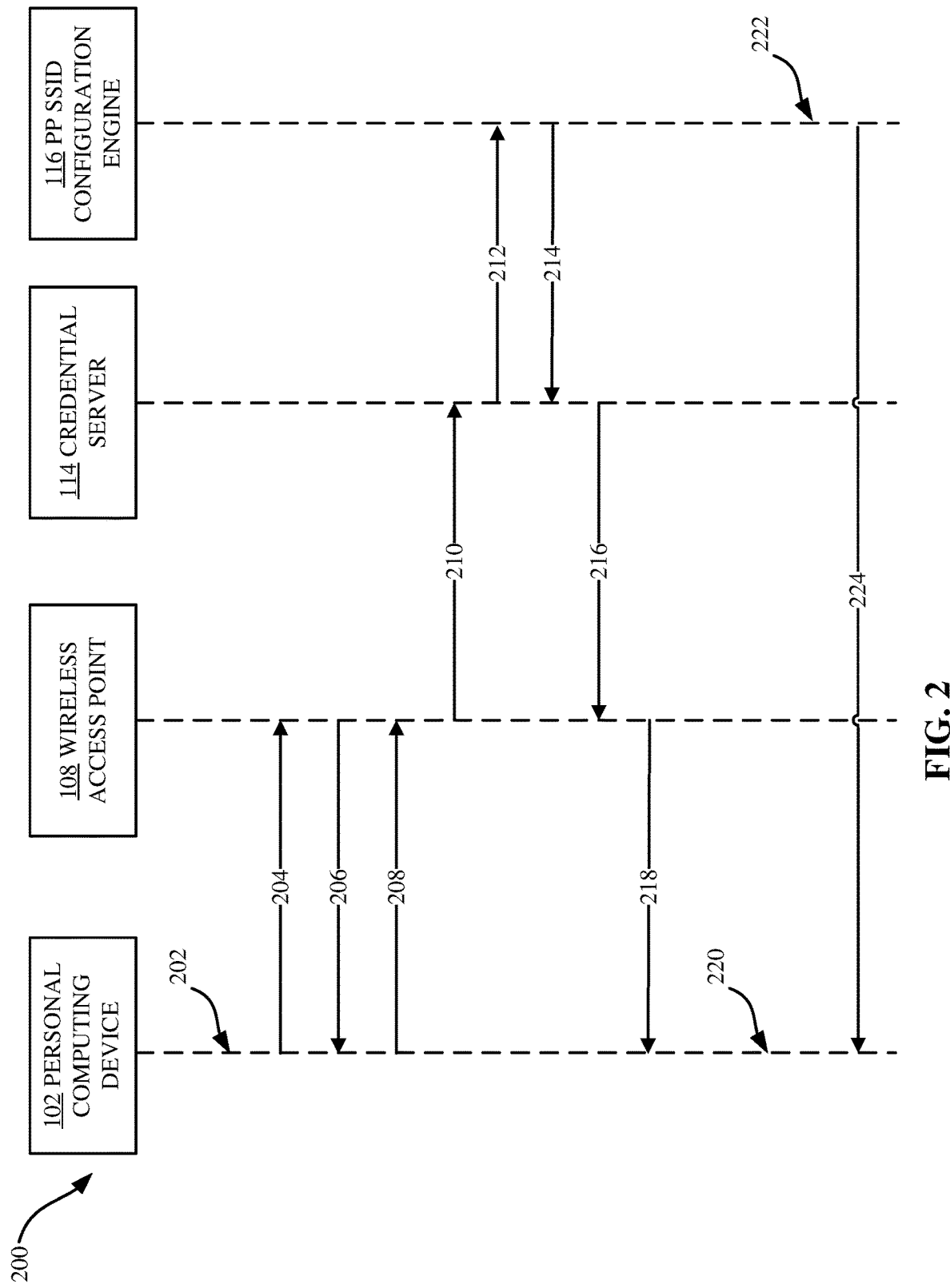
FIG. 2 illustrates an example communication diagram for generating and utilizing PP SSIDs, in accordance with some embodiments of the present disclosure.

Referring now to FIG. 2, illustrated is a communication diagram 200 broadly illustrating various aspects of the present disclosure.

At time 202, the personal computing device 102 can be powered on (e.g., turned on, booted, initiated, etc.). At interaction 204, the personal computing device 102 can identify and can attach to a publicly advertised SSID via the WAP 108. At interaction 206, the WAP 108 can provide an authentication webpage to the personal computing device 102. At interaction 208, the personal computing device 102 can transfer registration information (e.g., sign-in, email address, name, etc.) to the WAP 108. At interaction 210, the WAP 108 can provide the registration information to credential server 114. At interaction 212, the credential server 114 can communicate with the PP SSID configuration engine 116 to generate a PP SSID profile 118 based at least partially on the registration information. At interaction 214, the PP SSID configuration engine 116 can provide information related to the PP SSID profile 118 to the credential server 114. At interaction 216, the credential server 114 can provide the PP SSID profile 118 to the WAP 108. In some embodiments, the WAP 108 can associate the media access control (MAC) address of the personal computing device 102 with the PP SSID profile 118 and store the association in a cache of the WAP 108. In other embodiments, the credential server 114 associates the MAC address of the personal computing device 102 with the PP SSID profile 118 and stores the association in the registration profile database 120.

At interaction 218, the WAP 108 can provide information related to the PP SSID profile 118 to the personal computing device 102 (e.g., PP SSID network name, PP SSID password). At time 220, the personal computing device 102 can establish the PP SSID connection 124, where the PP SSID connection 124 can include characteristics such as, but not limited to, single-device, single-use, password-protected, unadvertised, encrypted, and/or provisioned. In some embodiments, the PP SSID connection 124 cannot be discovered or utilized by other user devices interacting with WAP 108. At time 222, the PP SSID configuration engine 116 can monitor the PP SSID connection 124 for an expiration, where the expiration can be stored in the PP SSID profile 118, and where the expiration can include a time-based expiration, a usage-based expiration, and/or a location-based expiration. At interaction 224, the PP SSID configuration engine 116 can detect expiration of the PP SSID connection 124 and issue a self-destruct command related the PP SSID connection 124 to the credential server 114, the WAP 108, and/or the personal computing device 102 causing the PP SSID connection 124 to be terminated. In some embodiments, the self-destruct command further causes data associated with the PP SSID connection 124, generated by the PP SSID connection 124, generated during use of the PP SSID connection 124, and/or associated with PP SSID profile 118 to be deleted, where the deleted data can be deleted from a storage, memory, and/or cache of one or more of the personal computing device 102, the WAP 108, the credential server 114, and/or the PP SSID configuration engine 116.

The aforementioned aspects of FIG. 2 can be completed in any order and are not limited to those described. Additionally, some, all, or none of the aforementioned aspects can be completed, while still remaining within the spirit and scope of the present disclosure.

Figure 3:
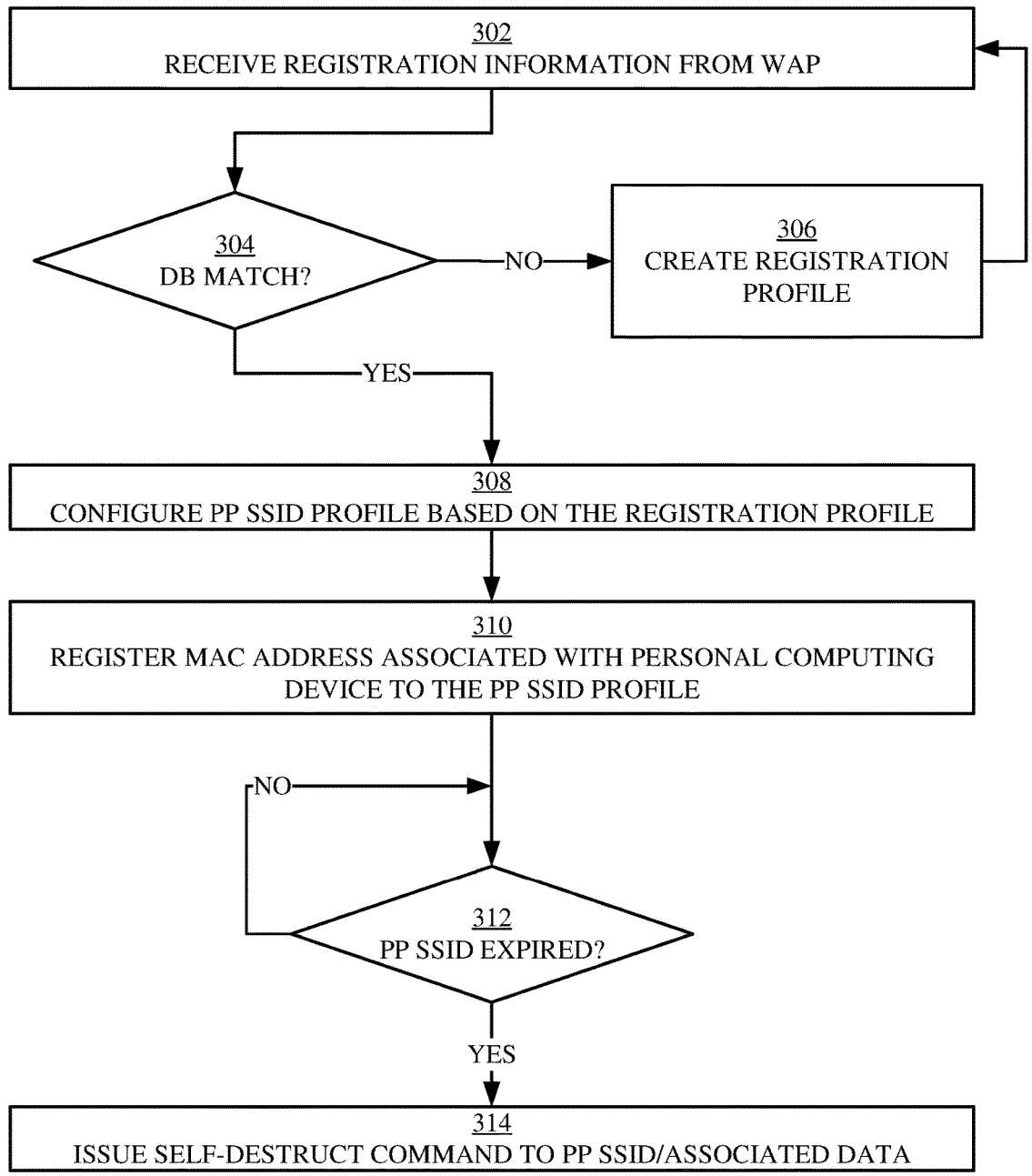
FIG. 3 illustrates a flowchart of an example method for implementing PP SSIDs using a credential server, in accordance with some embodiments of the present disclosure.

Referring now to FIG. 3, illustrated is a flowchart of an example method 300 for configuring a PP SSID profile 118, in accordance with some embodiments of the present disclosure. In some embodiments, the method 300 is performed by a credential server 114 or a different configuration of hardware and/or software.

At operation 302, the credential server 114 receives registration information from WAP 108. In some embodiments, the registration information is input to a main authentication webpage associated with the WAP 108 and subsequently transmitted to credential server 114.

At operation 304, the credential server 114 determines if the registration information received in operation 302 matches a registration profile stored in registration profile database 120. If the registration information matches a registration profile in registration profile database 120 (304: YES), the method 300 proceeds to operation 308. If the registration information does not match a registration profile in registration profile database 120 (304: NO), the method 300 proceeds to operation 306. In some embodiments, a registration profile matching a registration profile stored in registration profile database 120 can relate to existence of a commercial arrangement (e.g., contractual agreement, terms of service, etc.) for provisioning PP SSID functionality to the existing registration profile. In such embodiments, the registration information can be, for example, an employee identifier or other login indicating the registration information is associated with a commercial entity having a commercial arrangement for PP SSID provisioning. As another example, the registration information can be a personal login indicating an individual has a commercial arrangement for PP SSID provisioning.

At operation 306, the credential server 114 creates a registration profile based on the information received in operation 302. After creating the registration profile in operation 306, the method 300 can return to operation 302 to receive registration information having a database match in operation 304, or, in other embodiments, the method 300 can proceed directly to operation 308. At operation 308, the credential server 114 configures a PP SSID profile 118 based on the registration profile. Configuring the PP SSID profile 118 can include establishing parameters for a single-device, single-use, password-protected, unadvertised, encrypted, and/or provisioned PP SSID connection 124 based on, customized for, tailored to, or otherwise configured according to the registration profile associated with the personal computing device 102. The configuration of PP SSID profile 118 can include, for example, a PP SSID network name (e.g., a 32-character identifier, a 32-byte identifier, etc.), a password (e.g., a fingerprint-based password, a voice-based password, a face-based password, a gait-based password, an alphanumeric password, a pattern-based password, etc.), a time-based expiration (e.g., a date and time of expiration, an amount of time until expiration, etc.), a usage-based expiration (e.g., a threshold amount of bandwidth, a type of usage, etc.), a location-based expiration (e.g., inside or outside of a geofence surrounding a predetermined location), or a different expiration parameter. In some embodiments, PP SSID profile 118 further includes authentication protocols (e.g., one-time password (OTP) protocols, multi-factor authentication protocols, etc.).

At operation 310, the credential server 114 registers the media access control (MAC) address associated with the personal computing device 102 to the PP SSID profile 118.

At operation 312, the credential server 114 determines if the PP SSID profile 118 is expired (or otherwise nullified). Credential server 114 can determine if the PP SSID profile 118 is expired by comparing a current date and/or time to an expiration date and/or time. If the current date and/or time exceeds the expiration date and/or time, then the PP SSID profile 118 is expired, otherwise not.

Alternatively, or in addition, operation 312 can compare an amount of usage of PP SSID connection 124 with a usage expiration, where if the amount of usage accumulated using PP SSID connection 124 exceeds the usage expiration (e.g., is above 1 Gigabyte of data), the PP SSID profile 118 is expired, otherwise not.

Alternatively, or in addition, operation 312 can compare a type of usage of PP SSID connection 124 with a usage parameter, where if the type of usage does not satisfy the usage parameter (e.g., less than one data transfer above 1 megabyte for any ten-minute interval within the prior 60 minutes), then the PP SSID profile 118 is expired, otherwise not.

Alternatively, or in addition, operation 312 can compare a location of personal computing device 102 to a geofence associated with the PP SSID profile 118. In such embodiments, if the personal computing device 102 is outside of the geofence, the PP SSID profile 118 is expired, otherwise not.

If the PP SSID profile 118 is not expired (312: NO), then the method 300 returns to operation 312 continuously, semi-continuously, intermittently, or at predetermined intervals in order to monitor the PP SSID profile 118 for expiration. If the credential server 114 determines that the PP SSID profile 118 is expired or otherwise nullified (312: YES), then the method 300 continues to operation 314.

At operation 314, the credential server 114 issues a self-destruct command to the PP SSID profile 118 and data associated with the PP SSID profile 118. Issuing the self-destruct command can include transmitting the self-destruct command to the WAP 108 and/or the personal computing device 102. Issuing the self-destruct command can cause the PP SSID connection 124 to be terminated. Issuing the self-destruct command can cause data created as a result of utilizing the PP SSID connection 124 to be deleted (e.g., by deleting data in a cache of WAP 108 or personal computing device 102 associated with the activity resulting from using the PP SSID connection 124).

The aforementioned operations can be completed in any order and are not limited to those described. Additionally, some, all, or none of the aforementioned operations can be completed, while still remaining within the spirit and scope of the present disclosure.

Figure 4:
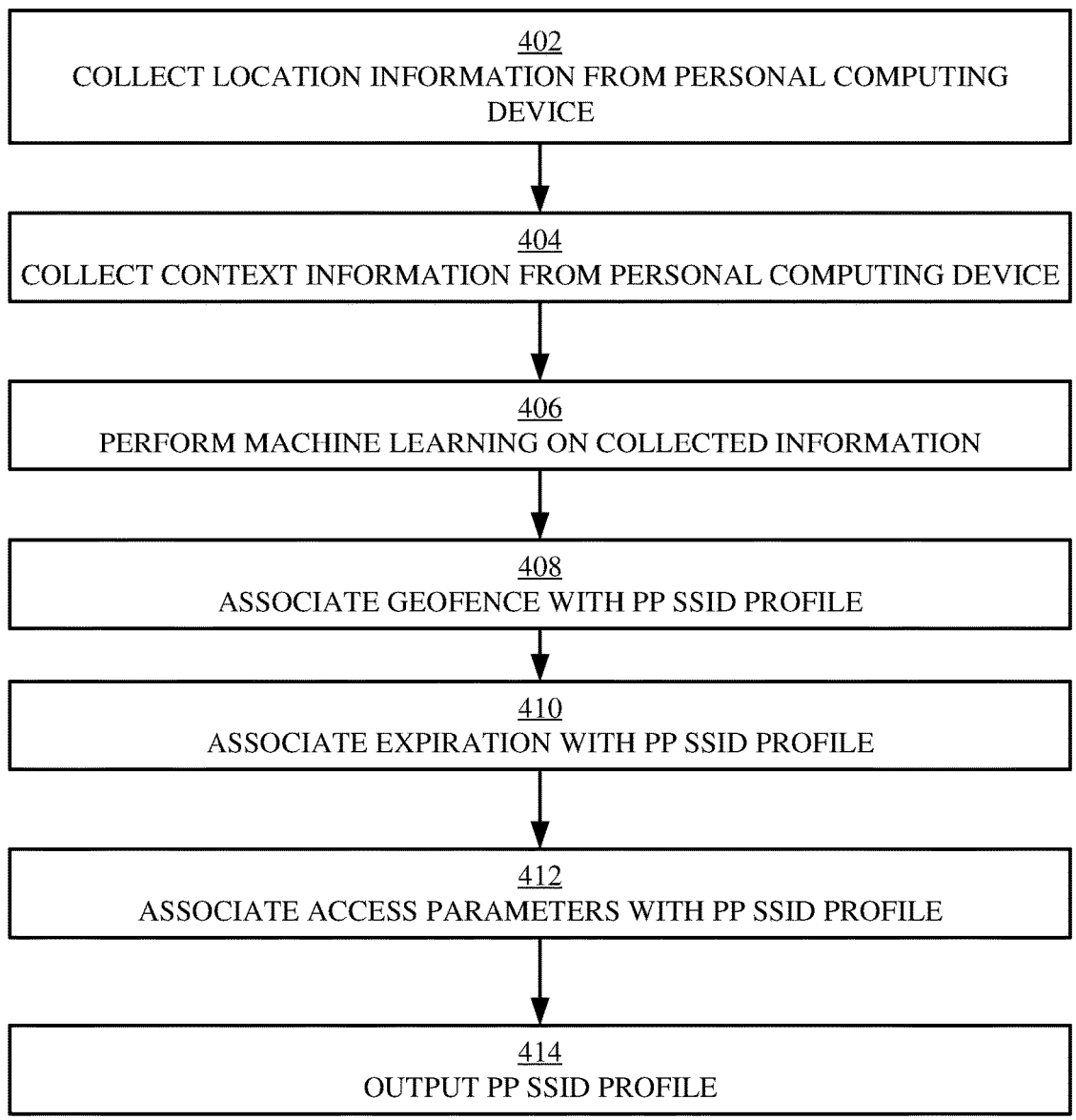
FIG. 4 illustrates a flowchart of an example method for generating a registration profile, in accordance with some embodiments of the present disclosure.

Referring now to FIG. 4, illustrated is a flowchart of an example method 400 for configuring a PP SSID profile 118, in accordance with some embodiments of the present disclosure. In some embodiments, the method 400 is a sub-method of method 300, and an example of operation 308 of FIG. 3. In some embodiments, the method 400 is implemented by a credential server 114 or a different combination of hardware and/or software.

At operation 402, the credential server 114 collects location information from the personal computing device 102, where the location information can be based on, for example, data from a PP SSID application executing on the personal computing device 102, data manually entered by a user into the personal computing device 102 and transmitted to the credential server 114, global positioning system (GPS) coordinates transmitted from the personal computing device 102 to the credential server 114, inferred location information based on web browsing history, map usage, and so on, and/or a different source of location information.

At operation 404, the credential server 114 collects context information from the personal computing device 102. Context information can be related to a preferred usage (e.g., streaming video, checking email, uploading information, personal hotspot usage, and the like). Context information can also be related to a predicted usage, where the predicted usage can be based on historical data from the personal computing device 102 and/or data related to the location information collected at operation 402. Predicted usage can include a predicted date and time a next PP SSID connection 124 will be requested by the personal computing device 102. This information may be used to predictively provision a PP SSID profile 118 near the predicted date and time of the next PP SSID connection 124 request (discussed in more detail with respect to FIG. 5).

Though this disclosure may pertain to the collection of personal data (e.g., location data, context data, web browsing history, usage history, etc.), it is noted that in embodiments, users may opt-in to any system collecting this personal data. In doing so, users can be informed of what data is collected, how any collected data will be used, whether any collected data may be encrypted while being used, and so on. Furthermore, for any opt-in system, users can also opt-out at any time. For any user electing to opt-out, any personal data of the user can be identified and deleted. Further, any personal data can be managed according to relevant rules and restrictions that may be defined by companies, industries, countries, treaties, and the like.

At operation 406, the credential server 114 can perform machine learning on the information collected in operations 402-404. Machine learning algorithms can include, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The output of operation 406 includes one or more of, a predicted period of usage (e.g., a predicted expiration), a predicted area of usage (e.g., a predicted geofence), a predicted amount of usage (e.g., a predicted network speed, download volume, upload volume, etc.), a predicted type of usage (e.g., email, streaming, web browsing, application usage, rate of data upload/download, etc.), and/or other predictions.

At operation 408, the credential server 114 associates a geofence with the PP SSID profile 118. The geofence can be, for example, a room (e.g., a hotel room), a property (e.g., a hotel area), a metro area (e.g., a downtown city-center), or a different geofence.

At operation 410, the credential server 114 associates a time-based expiration with the PP SSID profile 118. The expiration can include a date and/or time that the PP SSID profile 118 will expire and any associated PP SSID connection 124 will be terminated. As one example, the expiration can be associated with a checkout date and checkout time of a hotel owning the WAP 108 and/or credential server 114. As another example, the expiration can be associated with a length of a conference that is renting network usage on the WAP 108 and/or the credential server 114.

At operation 412, the credential server 114 associates access parameters with the PP SSID profile 118. Access parameters can include a PP SSID network name, a PPS SSID password, and the like. As one example, the PP SSID password can include a biometric password, where the biometric password is based on facial recognition, voice recognition, fingerprint identification, iris recognition, retina recognition, gait (stride) recognition, and the like). As another example, the PP SSID password can include a numeric password, an alphabetical password, an alphanumeric password, a pattern-based password, or the like.

At operation 414, the credential server 114 outputs the PP SSID profile 118. Outputting the PP SSID profile 118 can include saving the PP SSID profile 118 in the credential server 114, transmitting data related to the PP SSID profile 118 to the WAP 108, and/or transmitting data related to the PP SSID profile 118 to the personal computing device 102.

The aforementioned operations can be completed in any order and are not limited to those described. Additionally, some, all, or none of the aforementioned operations can be completed, while still remaining within the spirit and scope of the present disclosure.

Figure 5:
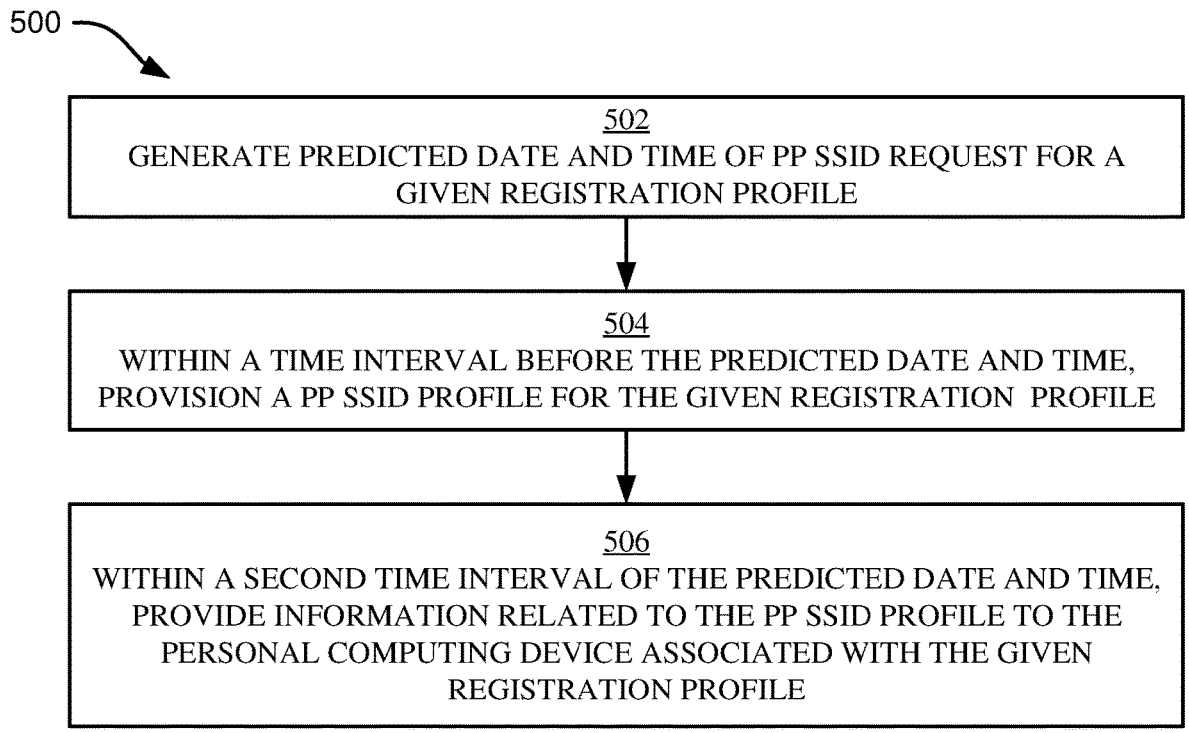
FIG. 5 illustrates a flowchart of an example method for predictively provisioning PP SSIDs, in accordance with some embodiments of the present disclosure.

Referring now to FIG. 5, illustrated is a flowchart of an example method 500 for predictively configuring a PP SSID profile 118, in accordance with some embodiments of the present disclosure. In some embodiments, the method 500 is a sub-method of the method 300, and an example of operation 308 of FIG. 3. The method 500 can be implemented by a credential server 114 or a different configuration of hardware and/or software.

At operation 502, the credential server 114 generates a predicted date and time of a PP SSID request for a given registration profile stored in registration profile database 120. Operation 502 can include utilizing machine learning algorithms such as the machine learning algorithms previously discussed with respect to FIG. 4. In such embodiments, the input to the machine learning algorithm can be a registration profile, or portion thereof, and the output can be a predicted date and time of a next PP SSID request. In other embodiments, a future PP SSID request can be manually input by a user updating a registration profile, where the user indicates a desire for a PP SSID connection 124 at a certain date and time in the future (or at recurring dates and times in the future such as every Monday at 11:00 AM to coincide with a weekly meeting at a hotel conference center).

At operation 504, the credential server 114 configures (e.g., provisions, generates, creates, etc.) a PP SSID profile 118 for the registration profile from operation 502 within a time interval (e.g., 1 hour, 5 minutes, etc.) before the predicted date and time.

At operation 506, the credential server 114 provides relevant information of the PP SSID profile 118 configured in operation 504 to the personal computing device 102 (via WAP 108), thereby enabling the personal computing device 102 to establish a PP SSID connection 124 within a second time interval of the predicted date and time using the relevant information of the PP SSID profile 118. The relevant information can include one or more of a PP SSID network name, a PP SSID password, expiration information, terms of usage information, and the like.

The aforementioned operations can be completed in any order and are not limited to those described. Additionally, some, all, or none of the aforementioned operations can be completed, while still remaining within the spirit and scope of the present disclosure.

Figure 6:
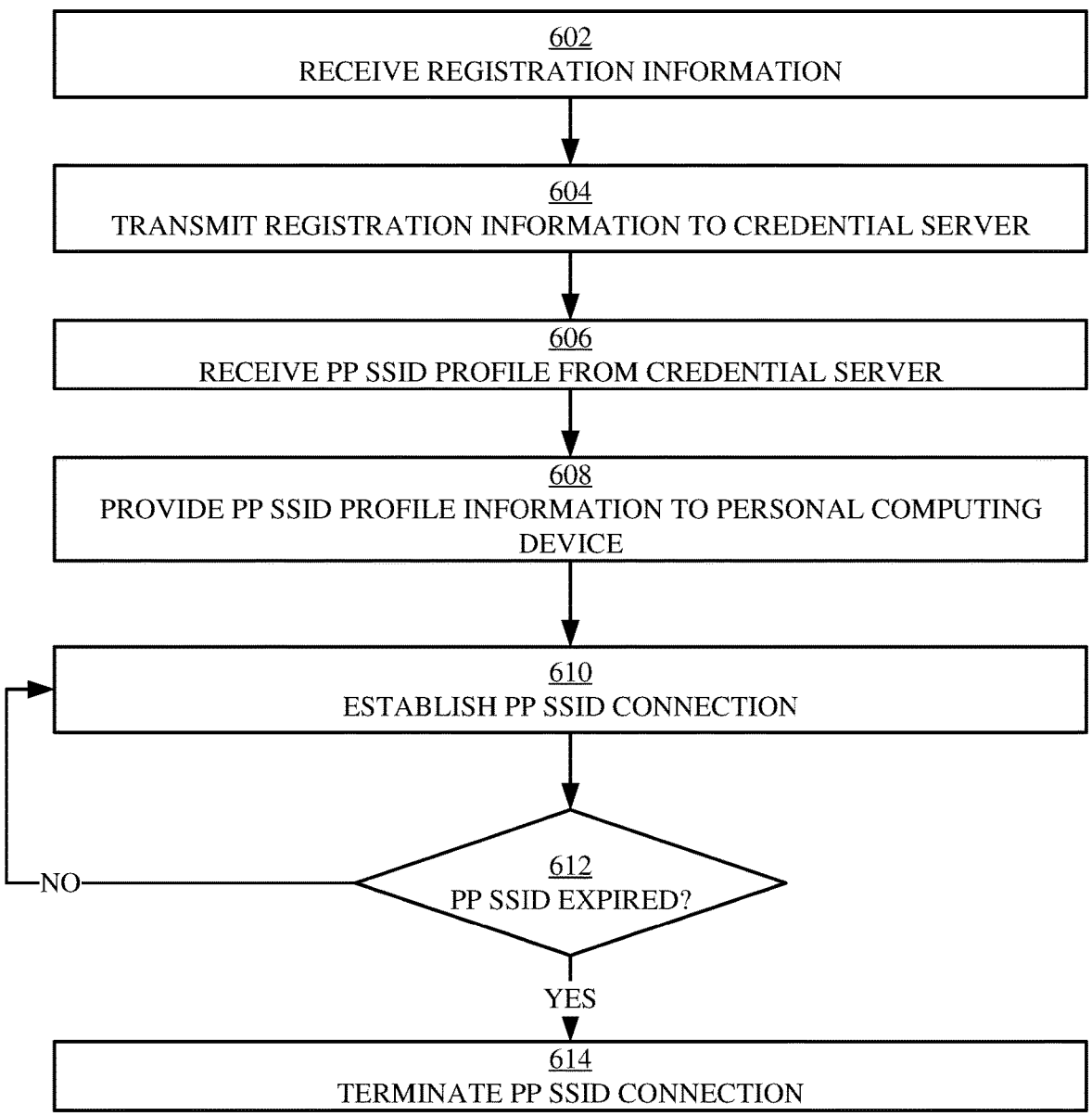
FIG. 6 illustrates a flowchart of an example method for implementing PP SSIDs using a Wireless Access Point (WAP), in accordance with some embodiments of the present disclosure.

Referring now to FIG. 6, illustrated is a flowchart of an example method 600 for implementing a PP SSID connection 124, in accordance with various embodiments of the present disclosure. In some embodiments, the method 600 is performed by WAP 108 or a different configuration of hardware and/or software.

At operation 602, the WAP 108 receives registration information from a personal computing device 102. Registration information can include, but is not limited to, a name, an email, a sign-in name (e.g., screen name, username), an alphanumeric identifier, an address, a password (e.g., an alphanumeric password, a personal identification number (PIN), biometric data related to fingerprints, facial recognition, voice recognition, iris/retina/eye information, and/or other biometric data, and/or the like), contextual information (e.g., calendar information related to planned activities, areas, and/or times, and the like), and so on. The WAP 108 can receive the registration information based on user input to the personal computing device 102, where the user input is input to an application, a webpage, or the like. In some embodiments, the registration information is automatically generated based on, for example, a location of the personal computing device 102, a MAC address of the personal computing device 102, and the like.

At operation 604, the WAP 108 transmits the registration information to the credential server 114, where the credential server 114 can determine if the registration information corresponds to an existing registration profile or if a new registration profile should be created.

At operation 606, the WAP 108 receives a PP SSID profile 118 from the credential server 114, and, at operation 612, the WAP 108 provides relevant information of the PP SSID profile 118 to the personal computing device 102. Operation 612 can include transmitting, for example, a PP SSID network name and a PP SSID password to the personal computing device 102 so that the user of the personal computing device 102 can initiate the PP SSID connection 124 with the WAP 108 using the PP SSID network name and PP SSID password.

At operation 610, the WAP 108 establishes the PP SSID connection 124 for the personal computing device 102 to access the Internet 126. In some embodiments, operation 610 includes the personal computing device 102 successfully authenticating with the WAP 108 for the usage of the PP SSID connection 124 using the credentials associated with the PP SSID profile 118. In such embodiments, the authentication can be performed on an authentication webpage presented on the personal computing device 102 and associated with the WAP 108.

At operation 612, the WAP 108 determines if the PP SSID profile 118 is expired. In various embodiments, the WAP 108 determines if the PP SSID profile 118 is expired, or the WAP 108 receives an indication from another source (e.g., credential server 114, PP SSID configuration engine 116, etc.), that the PP SSID profile 118 is expired. PP SSID expiration can be related to date, time, location, usage, and/or a different factor.

If the WAP 108 determines that the PP SSID profile 118 is not expired or if the WAP 108 determines that it has not received any information related to the PP SSID profile 118 being expired (612: NO), then the method 600 returns to operation 610 and maintains PP SSID connection 124. If the WAP 108 determines that the PP SSID profile 118 is expired or if the WAP 108 receives an indication that the PP SSID profile 118 is expired (612: YES), the method 600 proceeds to operation 614.

At operation 614, the WAP 108 terminates the PP SSID connection 124 and/or deletes data associated with the PP SSID connection 124 and/or the PP SSID profile 118. In some embodiments, operation 614 includes deleting data from a cache of the WAP 108 that is related to the PP SSID connection 124 and/or the PP SSID profile 118.

The aforementioned operations can be completed in any order and are not limited to those described. Additionally, some, all, or none of the aforementioned operations can be completed, while still remaining within the spirit and scope of the present disclosure.

Figure 7:
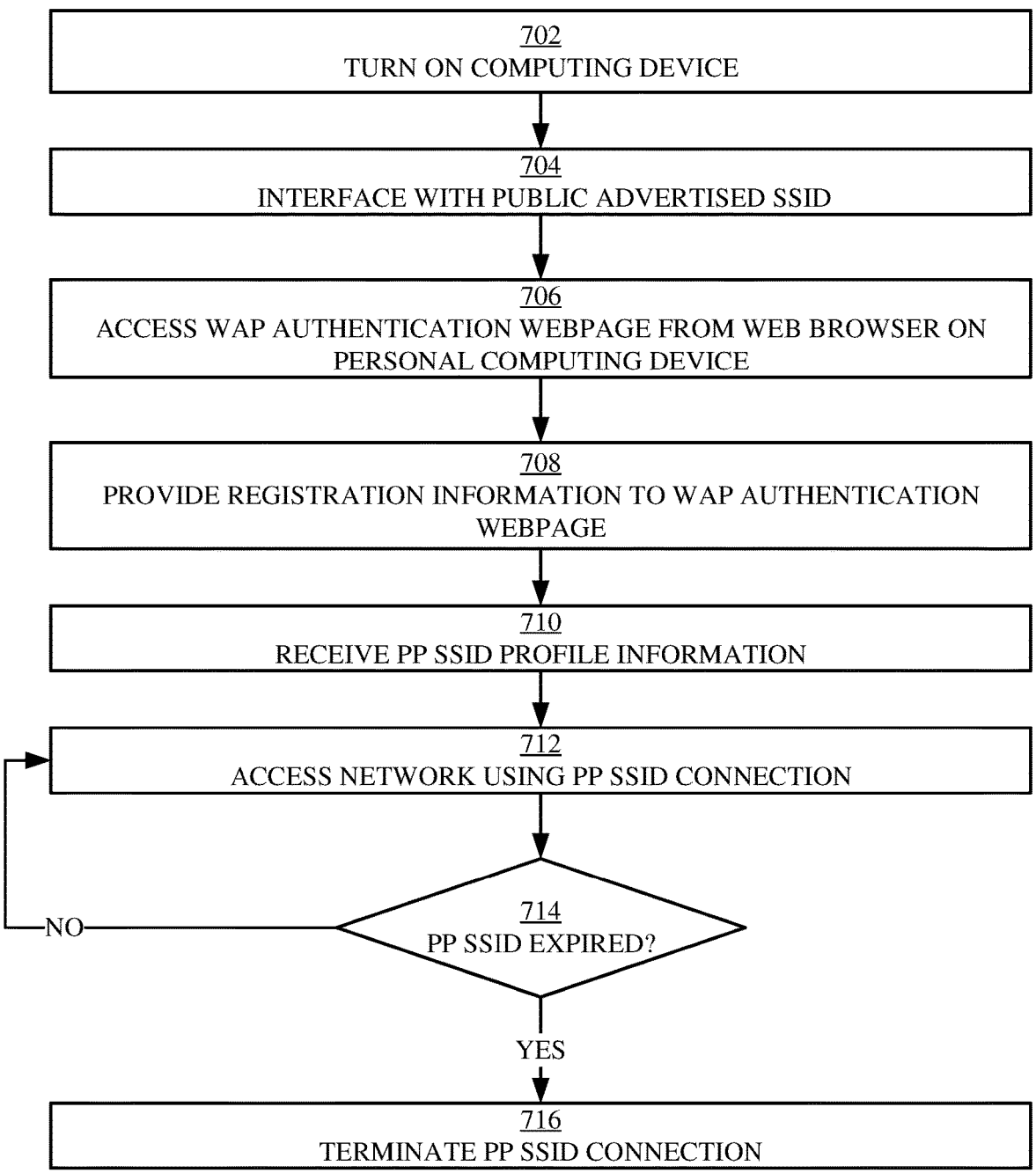
FIG. 7 illustrates a flowchart of an example method for implementing PP SSIDs using a personal computing device, in accordance with some embodiments of the present disclosure.

Referring now to FIG. 7, illustrated is a flowchart of an example method 700 for utilizing a PP SSID connection 124 at a personal computing device 102, in accordance with embodiments of the present disclosure. In some embodiments, the method 700 is implemented by a personal computing device 102 or a different configuration of hardware and/or software.

At operation 702, the personal computing device 102 is turned on (e.g., powered on, booted, an application associated with PP SSID functionality is launched, etc.).

At operation 704, the personal computing device 102 interfaces with a publicly advertised SSID of the WAP 108 (e.g., a hotel's guest network, a restaurant's guest network, etc.).

At operation 706, the personal computing device 102 is redirected to an authentication webpage of the WAP 108. At operation 708, the personal computing device 102 provides registration information from the personal computing device 102 to the WAP 108.

At operation 710, the personal computing device 102 receives information related to a configured PP SSID profile 118 from the WAP 108. In some embodiments, the PP SSID information includes a PP SSID network name and/or a PP SSID password so that the personal computing device 102 can initiate a PP SSID connection 124 by inputting the PP SSID network name and the PP SSID password to WAP 108 via an interface of personal computing device 102.

In operation 712, the personal computing device 102 accesses the Internet 126 using the PP SSID connection 124. In some embodiments, the personal computing device 102 is the only device accessing the network using the PP SSID connection 124. Furthermore, in some embodiments, no other device can see the PP SSID connection 124. Furthermore, in some embodiments, the PP SSID connection 124 is encrypted.

At operation 714, the personal computing device 102 can determine if the PP SSID profile 118 is expired. In some embodiments, operation 714 includes determining if a current date and time is past an expiration date and time. In some embodiments, operation 714 includes determining if a current location of the personal computing device 102 is outside a predetermined geofence that is associated with PP SSID profile 118. In some embodiments, operation 714 includes determining if an indication that the PP SSID profile 118 is expired has been received at the personal computing device 102 (e.g., from WAP 108 or credential server 114).

If the PP SSID profile 118 is not expired (714: NO), the method 700 returns to operation 712 and maintains the PP SSID connection 124. If the PP SSID profile 118 is expired (714: YES), the method 700 proceeds to operation 716 and terminates the PP SSID connection 124. In some embodiments, operation 716 further includes deleting data associated with the PP SSID connection 124 (e.g., deleting data in a cache of personal computing device 102 that was generated as a result of utilizing the PP SSID connection 124).

The aforementioned operations can be completed in any order and are not limited to those described. Additionally, some, all, or none of the aforementioned operations can be completed, while still remaining within the spirit and scope of the present disclosure.

Figure 8B:
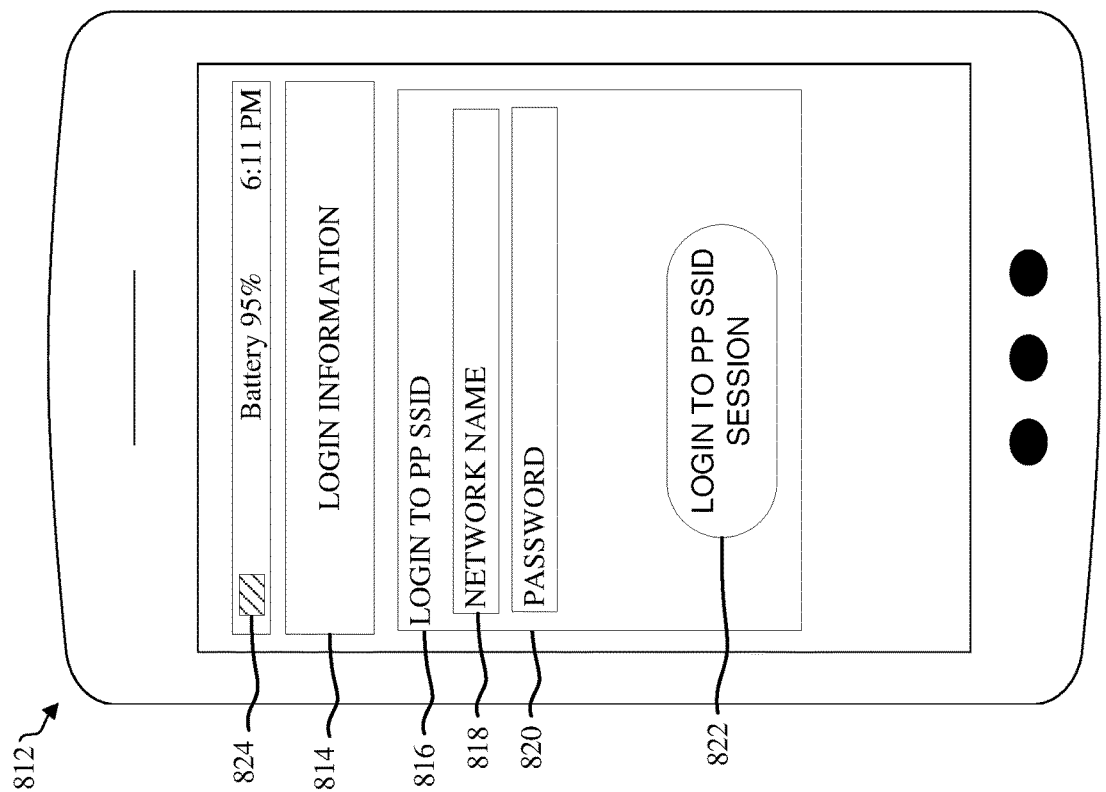
FIG. 8B illustrates an interface functionality diagram of a personal computing device utilizing a PP SSID, in accordance with some embodiments of the present disclosure.
Figure 8A:
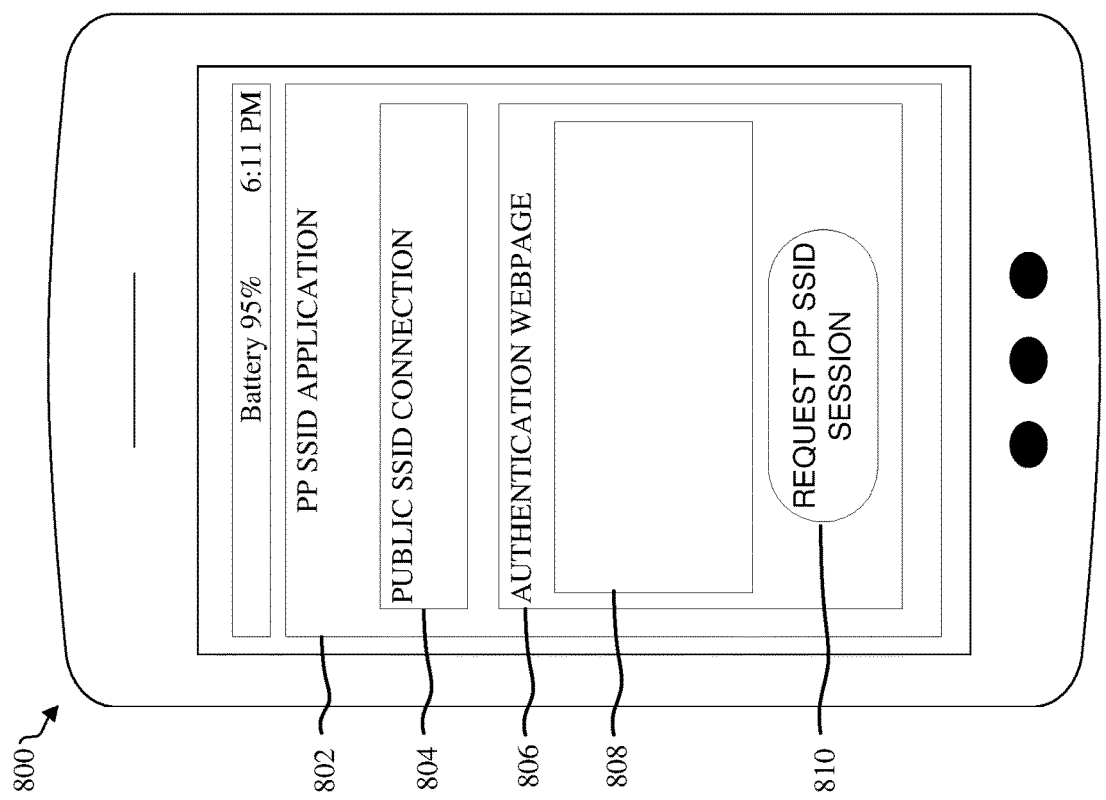
FIG. 8A illustrates an interface functionality diagram of a personal computing device requesting a PP SSID, in accordance with some embodiments of the present disclosure.

Referring now to FIG. 8A, illustrated is an interface functionality diagram of a device at a first time 800 for requesting a PP SSID session, in accordance with embodiments of the present disclosure. The device at the first time 800 can include on its display a window for the PP SSID application 802 executing on the device at the first time 800. The PP SSID application 802 can display a public SSID connection 804 being used to connect to WAP 108. The device at the first time 800 can be directed to an authentication webpage 806 associated with the WAP 108. A user of the device at the first time 800 can input registration information into a display field 808 and transmit the registration information to a credential server 114 via the WAP 108 by requesting a PP SSID session using a PP SSID request button 810.

Referring now to FIG. 8B, illustrated is an interface functionality diagram of the device at a second time 812 for logging into a configured PP SSID channel, in accordance with some embodiments of the present disclosure. The device at the second time 812 presents login information 814 related to a configured PP SSID profile 118 and received from credential server 114 via WAP 108. The login information 814 can include, for example, a PP SSID network name, a PP SSID password, expiration information (e.g., an expiration date and time, an amount of usage, a type of usage, an area of usage, etc.), encryption information, and so on. The device at the second time 812 can further present a PP SSID login screen 816 capable of receiving the PP SSID network name 818 and the PP SSID password 820 based on user input. The device at the second time 812 further includes a login to PP SSID session button 822 or other initiating interface element for transmitting the login credentials from the PP SSID login screen 816 to the WAP 108 and/or the credential server 114. Upon successfully establishing the PP SSID connection 124, the device at the second time 812 can display a first indicator 824 of a PP SSID connection 124, where the first indicator 824 can have any number of patterns, colors, shapes, sizes, and the like.

Figure 9B:
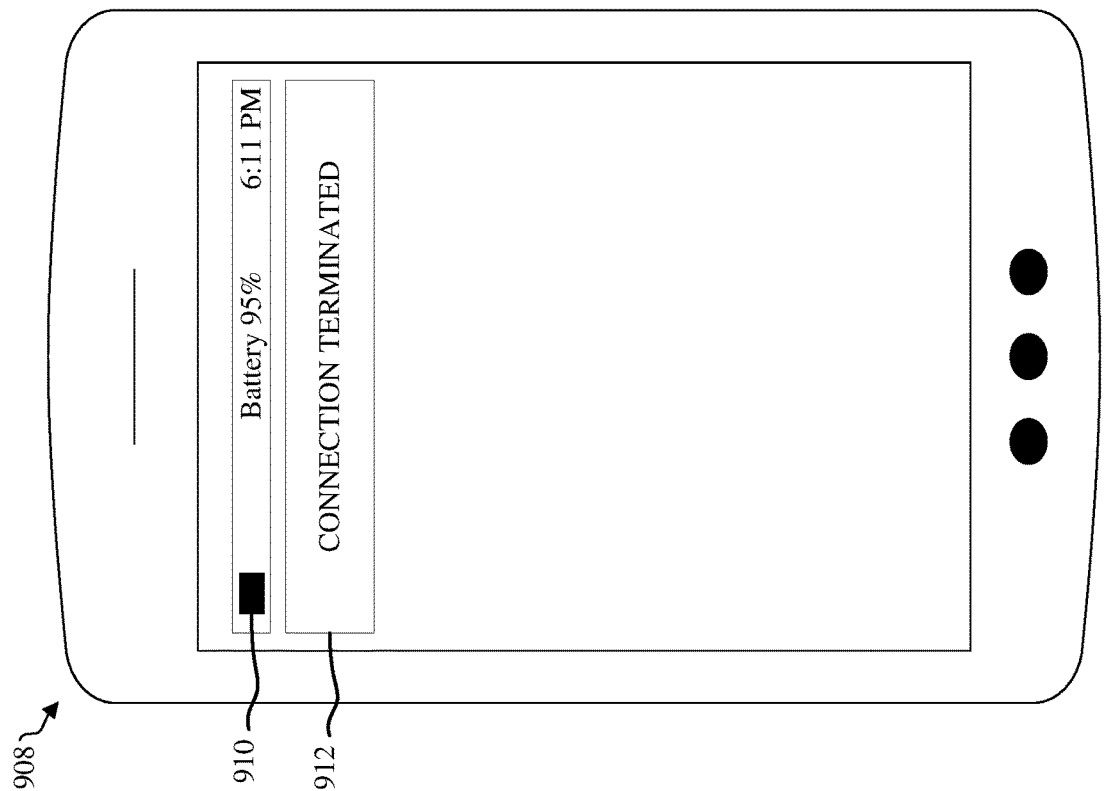
FIG. 9B illustrates an interface functionality diagram of a personal computing device having a terminated PP SSID connection, in accordance with some embodiments of the present disclosure.
Figure 9A:
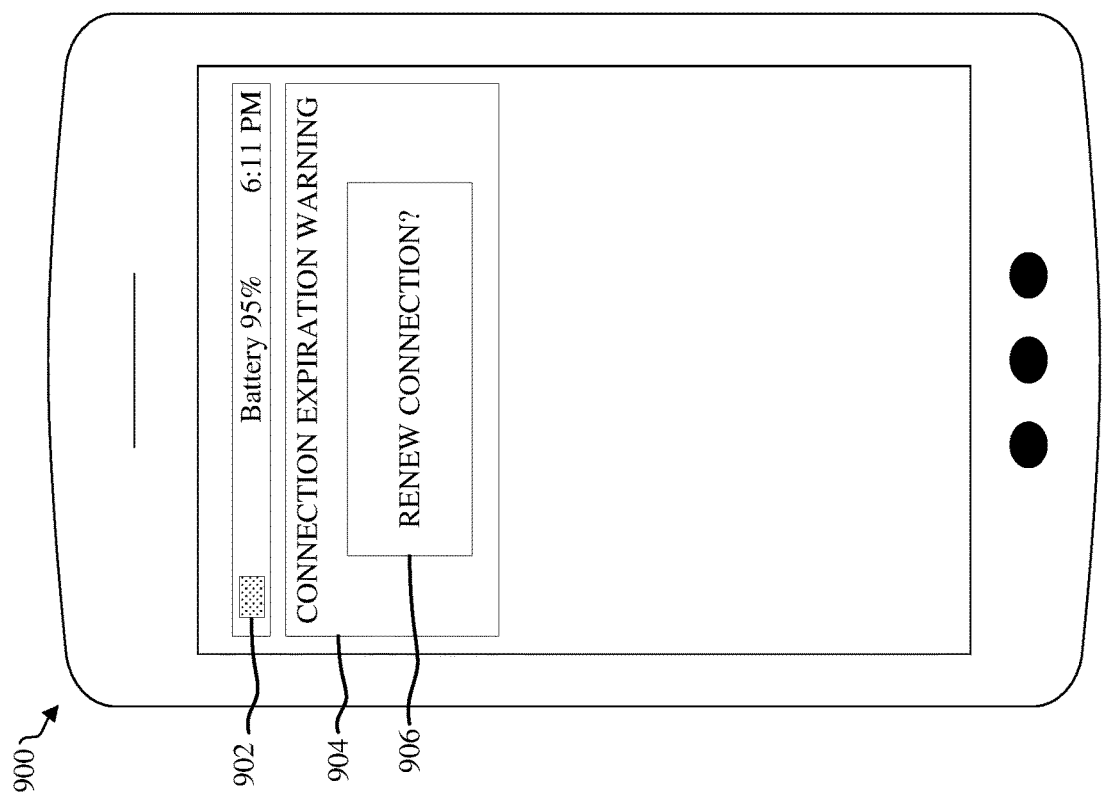
FIG. 9A illustrates an interface functionality diagram of a personal computing device utilizing a PP SSID nearing expiration, in accordance with some embodiments of the present disclosure.

Referring now to FIG. 9A, illustrated is an interface functionality diagram of the device at a third time 900 for displaying a warning of PP SSID expiration, in accordance with some embodiments of the present disclosure. In some embodiments, the device at the third time 900 can include a second indicator 902 symbolizing nearing expiration of the PP SSID session, where the second indicator 902 can be different than the first indicator 824 discussed with respect to FIG. 8B (e.g., different color, pattern, shape, etc.). The device at the third time 900 can also display a connection expiration warning 904 and prompt the user to renew the connection 906, where renewing the connection 906 can either generate a new PP SSID profile 118 for a new PP SSID connection 124 or extend the expiration of the current PP SSID profile 118 and corresponding PP SSID connection 124.

Referring now to FIG. 9B, illustrated is an interface functionality diagram of the device at a fourth time 908 for notifying the user of an expired PP SSID session, in accordance with some embodiments of the present disclosure. The device at the fourth time 908 can include a third indicator 910 that is different from the first indicator 824 and the second indicator 902. The third indicator 910 can represent a terminated PP SSID network connection. Furthermore, the device at the fourth time 908 can present a connection terminated notification 912.

The diagrams of FIGS. 8A-8B and 9A-9B can include more functionality, less functionality, and/or different functionality than the functionality explicitly shown while remaining within the spirit and scope of the present disclosure.

Figure 10:
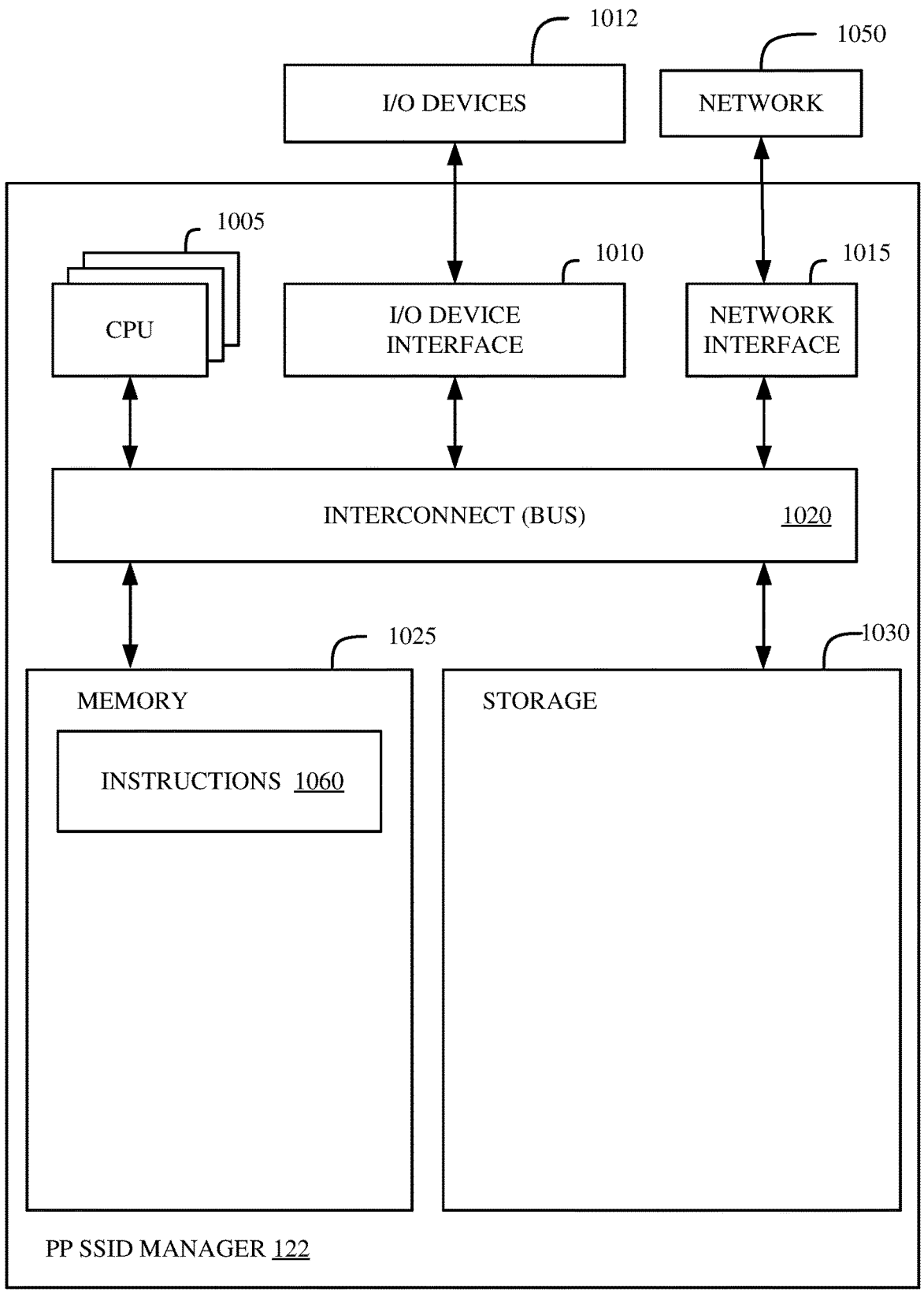
FIG. 10 illustrates a block diagram of an example PP SSID manager, in accordance with some embodiments of the present disclosure.

FIG. 10 illustrates a block diagram of an example PP SSID manager 122 in accordance with some embodiments of the present disclosure. PP SSID manager 122 can be a combination of hardware and/or software configured to manage PP SSID connections. PP SSID manager 122 can reside within one or more of personal computing device 102, WAP 108, and/or credential server 114.

In various embodiments, PP SSID manager 122 can perform the methods described in FIGS. 2-7 and/or the functionality discussed in FIGS. 1, 8A-8B, and 9A-9B. In some embodiments, the PP SSID manager 122 receives instructions related to aforementioned methods and functionalities by downloading processor-executable instructions from a remote data processing system via a network 1050. In other embodiments, PP SSID manager 122 provides instructions for the aforementioned methods and/or functionalities to a client machine such that the client machine executes the method, or a portion of the method, based on the instructions provided by the PP SSID manager 122.

The PP SSID manager 122 includes a memory 1025, storage 1030, an interconnect 1020 (e.g., BUS), one or more CPUs 1005 (e.g., processors), an I/O device interface 1010, I/O devices 1012, and a network interface 1015.

Each CPU 1005 retrieves and executes programming instructions stored in the memory 1025 or storage 1030. The interconnect 1020 is used to move data, such as programming instructions, between the CPUs 1005, I/O device interface 1010, storage 1030, network interface 1015, and memory 1025. The interconnect 1020 can be implemented using one or more busses. The CPUs 1005 can be a single CPU, multiple CPUs, or a single CPU having multiple processing cores in various embodiments. In some embodiments, a CPU 1005 can be a digital signal processor (DSP). In some embodiments, CPU 1005 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 1025 is generally included to be representative of a random access memory (e.g., static random access memory (SRAM), dynamic random access memory (DRAM), or Flash). The storage 1030 is generally included to be representative of a non-volatile memory, such as a hard disk drive, solid state device (SSD), removable memory cards, optical storage, or flash memory devices. In an alternative embodiment, the storage 1030 can be replaced by storage area-network (SAN) devices, the cloud, or other devices connected to the PP SSID manager 122 via the I/O device interface 1010 or a network 1050 via the network interface 1015.

In some embodiments, the memory 1025 stores instructions 1060. However, in various embodiments, the instructions 1060 are stored partially in memory 1025 and partially in storage 1030, or they are stored entirely in memory 1025 or entirely in storage 1030, or they are accessed over a network 1050 via the network interface 1015.

Instructions 1060 can be processor-executable instructions for performing any portion of, or all of, any of the methods of FIGS. 2-7 and/or any of the functionality discussed in FIGS. 1, 8A-8B, and/or 9A-9B.

In various embodiments, the I/O devices 1012 include an interface capable of presenting information and receiving input. For example, I/O devices 1012 can present information to a user interacting with PP SSID manager 122 and receive input from the user.

PP SSID manager 122 is connected to the network 1050 via the network interface 1015. Network 1050 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
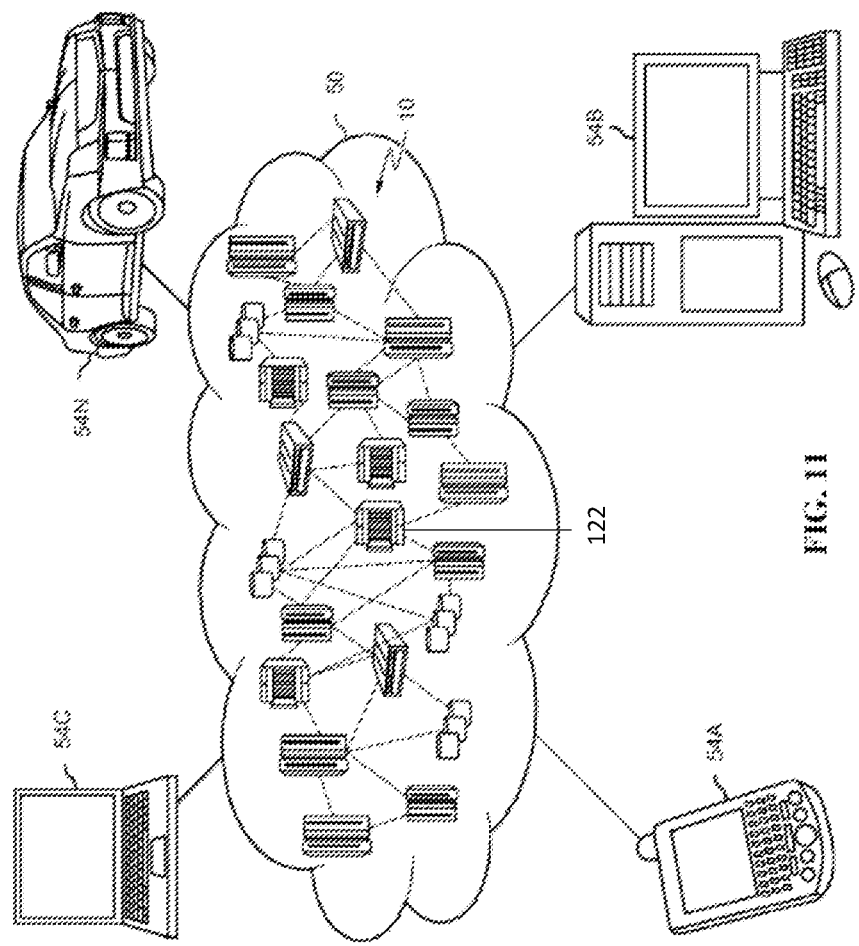
FIG. 11 depicts a cloud computing environment, according to some embodiments of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
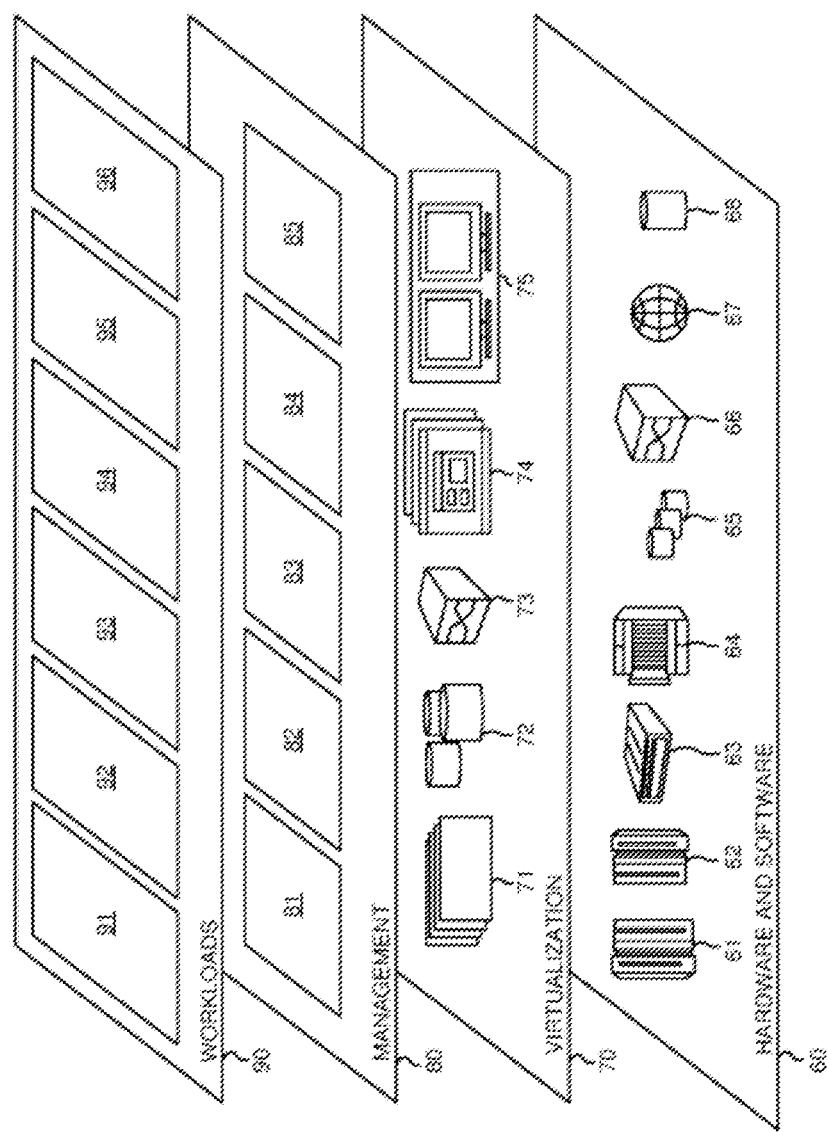
FIG. 12 depicts abstraction model layers, according to some embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PP SSID management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 1060 of FIG. 10 and/or any software configured to perform any subset of the methods described with respect to FIGS. 2-7 and/or any of the functionality discussed in FIGS. 1, 8A-8B, and 9A-9B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To further illustrate aspects of the present disclosure, several variations of the present disclosure will now be discussed.

A first variation relates to a system comprising a credential server storing a Personal-Public (PP) Service Set Identifier (SSID) profile configured according to registration information provided from a personal computing device. The system further comprising a Wireless Access Point (WAP) communicatively coupled to the credential server and configured to implement a PP SSID connection using the PP SSID profile to create a single-device, single-use, password-protected, unadvertised, and encrypted networking channel between the personal computing device and an Internet.

A second variation based on the first variation further includes where the PP SSID profile is associated with an expiration, and where the PP SSID connection is configured to be terminated according to the expiration.

A third variation based on the second variation further includes wherein the expiration is selected from a group consisting of: a time, an amount of usage, and a type of usage.

A fourth variation based on the second or third variation further includes wherein the expiration is based on a location of the personal computing device and a geofence defined in the PP SSID profile, and wherein the PP SSID connection is terminated when the personal computing device is outside of the geofence.

A fifth variation relates to a computer-implemented method comprising receiving, at a credential server and from a Wireless Access Point (WAP), registration information from a personal computing device in response to the personal computing device connecting to a publicly advertised Service Set Identifier (SSID) provided by the WAP. The method further comprising configuring, by the credential server, a Personal-Public (PP) SSID profile based on the registration information. The method further comprising providing a PP SSID network name and PP SSID password of the PP SSID profile to the personal computing device via the WAP, wherein the PP SSID profile enables the personal computing device to establish a PP SSID connection comprising a single-device, single-use, password-protected, unadvertised, and encrypted networking channel between the personal computing device and an Internet.

A sixth variation based on the fifth variation further includes associating a media access control (MAC) address of the personal computing device with the PP SSID profile.

A seventh variation based on the fifth or sixth variation further includes creating a registration profile associated with the registration information in response to determining that the registration information is not associated with a profile in a registration profile database.

An eighth variation based on the fifth, sixth, or seventh variation further includes determining the PP SSID profile is expired, and, in response to determining that the PP SSID profile is expired, terminating the PP SSID connection.

A ninth variation based on the eighth variation further includes wherein determining that the PP SSID profile is expired comprises determining a current time is after an expiration time associated with the PP SSID profile.

A tenth variation based on the eight or ninth variation further includes wherein determining that the PP SSID profile is expired comprises determining a current location is outside of a geofence associated with the PP SSID profile.

An eleventh variation based on any of the fifth through tenth variations further includes wherein configuring the Personal-Public (PP) SSID profile based on the registration information further comprises receiving location information related to the personal computing device, receiving context information related to the personal computing device, performing machine learning on the location information and the context information to generate a predicted area of usage and a predicted time of usage associated with the personal computing device, associating a geofence with the PP SSID profile based on the predicted area of usage, associating an expiration of the PP SSID profile based on the predicted time of usage, and outputting the PP SSID profile having the geofence and the expiration.

A twelfth variation based on any of the fifth through eleventh variations further includes wherein configuring the Personal-Public (PP) SSID profile based on the registration information further comprises generating a predicted time of a PP SSID request associated with the personal computing device, wherein providing the PP SSID network name and PP SSID password of the PP SSID profile to the personal computing device occurs within an interval of time before the predicted time.

A thirteenth variation is directed toward a computer program product comprising a computer readable storage medium having program instructions embodied therewith, the program instructions executable by a processor to cause the processor to perform a method comprising receiving, at a credential server and from a Wireless Access Point (WAP), registration information from a personal computing device in response to the personal computing device connecting to a publicly advertised Service Set Identifier (SSID) provided by the WAP. The method further comprising configuring, by the credential server, a Personal-Public (PP) SSID profile based on the registration information. The method further comprising providing a PP SSID network name and PP SSID password of the PP SSID profile to the personal computing device via the WAP, wherein the PP SSID profile enables the personal computing device to establish a PP SSID connection comprising a single-device, single-use, password-protected, unadvertised, and encrypted networking channel between the personal computing device and an Internet.

A fourteenth variation based on the thirteenth variation further includes determining the PP SSID profile is expired, and, in response to determining that the PP SSID profile is expired, terminating the PP SSID connection.

A fifteenth variation based on the fourteenth variation further includes wherein determining that the PP SSID profile is expired comprises determining a current time is after an expiration time associated with the PP SSID profile.

A sixteenth variation based on the fourteenth or fifteenth variation further includes wherein determining that the PP SSID profile is expired comprises determining a current location is outside of a geofence associated with the PP SSID profile.

A seventeenth variation based on any of the thirteenth through sixteenth variations further includes wherein configuring the Personal-Public (PP) SSID profile based on the registration information further comprises receiving location information related to the personal computing device, receiving context information related to the personal computing device, performing machine learning on the location information and the context information to generate a predicted area of usage and a predicted time of usage associated with the personal computing device, associating a geofence with the PP SSID profile based on the predicted area of usage, associating an expiration of the PP SSID profile based on the predicted time of usage, and outputting the PP SSID profile having the geofence and the expiration.

An eighteenth variation based on any of the thirteenth through seventeenth variations further includes wherein configuring the Personal-Public (PP) SSID profile based on the registration information further comprises generating a predicted time of a PP SSID request associated with the personal computing device, and wherein providing the PP SSID network name and PP SSID password of the PP SSID profile to the personal computing device occurs within an interval of time before the predicted time.

A nineteenth variation relates to a system comprising a processor and a computer-readable storage medium storing program instructions, wherein the processor is configured to execute the program instructions to cause the processor to perform a method comprising receiving, at a credential server and from a Wireless Access Point (WAP), registration information from a personal computing device in response to the personal computing device connecting to a publicly advertised Service Set Identifier (SSID) provided by the WAP. The method further comprising configuring, by the credential server, a Personal-Public (PP) SSID profile based on the registration information. The method further comprising providing a PP SSID network name and PP SSID password of the PP SSID profile to the personal computing device via the WAP, wherein the PP SSID profile enables the personal computing device to establish a PP SSID connection comprising a single-device, single-use, password-protected, unadvertised, and encrypted networking channel between the personal computing device and an Internet.

A twentieth variation based on the nineteenth variation further includes wherein the program instructions were downloaded to the computer-readable storage medium from a remote data processing system.

A twenty-first variation relates to a computer-implemented method comprising connecting a personal computing device to a publicly advertised service set identifier (SSID). The method further comprising providing registration information to an authentication webpage in response to connecting to the publicly advertised SSID. The method further comprising receiving a Personal-Public (PP) SSID network name and a PP SSID password in response to providing registration information to the authentication webpage. The method further comprising accessing an Internet using a PP SSID connection by establishing a single-device, single-use, password-protected, unadvertised, and encrypted networking channel between the personal computing device and the Internet.

A twenty-second variation based on the twenty-first variation further includes displaying, on the personal computing device, an indicator related to the PP SSID connection.

A twenty-third variation based on the twenty-second variation further includes displaying, on the personal computing device, a connection expiration warning at a time within a time interval before an expiration associated with the PP SSID connection.

A twenty-fourth variation based on the twenty-second variation or the twenty-third variation further includes displaying, on the personal computing device, a connection termination warning in response to a location of the personal computing device within a boundary of a geofence associated with the PP SSID profile.

A twenty-fifth variation based on any of the twenty-first variation through the twenty-fourth variation further includes wherein the PP SSID password comprises a biometric password selected from a group consisting of: a voice-based password, a face-based password, a fingerprint-based password, and a gait-based password.

What is claimed is:

1. A system comprising:
a credential server storing a plurality of Personal-Public (PP) Service Set Identifier (SSID) profiles configured according to registration information provided from a plurality of personal computing devices; and
a Wireless Access Point (WAP) communicatively coupled to the credential server and configured to implement an individualized PP SSID provisioning of a PP SSID connection for an associated individual personal computing device of the plurality of personal computing devices, the PP SSID connection being customized by using one of the PP SSID profiles to create a single-device, single-use, password-protected, unadvertised, and encrypted networking channel between the associated individual personal computing device and an Internet,
wherein the WAP implements the individualized PP SSID provisioning by accepting a connection of the associated individual personal computing device to a publicly advertised SSID, registering and configuring the PP SSID connection for the associated individual personal computing device, and the PP SSID connection being utilized to create the single-device, single-use, password-protected, unadvertised, and encrypted networking channel.

2. The system according to claim 1, wherein each of the PP SSID profiles is associated with an expiration, and wherein the PP SSID connection is configured to be terminated according to the expiration.

3. The system according to claim 2, wherein the expiration is selected from a group consisting of: a time, an amount of usage, and a type of usage.

4. The system according to claim 2, wherein the expiration is based on a location of the associated individual personal computing device and a geofence defined in each of the PP SSID profiles, and wherein the PP SSID connection is terminated when the associated individual personal computing device is outside of the geofence.

5. The system according to claim 1, wherein the configured Personal-Public (PP) SSID profile based on the registration information includes:
a location information related to the associated individual personal computing device,
a context information related to the associated individual personal computing device,
a machine learning based on the location information and the context information to generate a predicted area of usage and a predicted time of usage associated with the associated individual personal computing device,
an associated geofence with the PP SSID profile based on the predicted area of usage, and
an associated expiration of the PP SSID profile based on the predicted time of usage.

6. A computer-implemented method comprising:
storing a plurality of Personal-Public (PP) Service Set Identifier (SSID) profiles configured according to registration information provided from a plurality of personal computing devices; and
implementing an individualized PP SSID provisioning of a PP SSID connection for an associated individual personal computing device of the plurality of personal computing devices, the PP SSID connection being customized by using one of the plurality of PP SSID profiles for each personal computing device to create a single-device, single-use, password-protected, unadvertised, and encrypted networking channel between the associated personal computing device and an Internet,
wherein the one of the plurality of PP SSID profiles is associated with an expiration, and wherein the PP SSID connection is configured to be terminated according to the expiration, and the expiration is based on a location of the associated individual personal computing device and a geofence defined in the one of the plurality of PP SSID profiles, and wherein the PP SSID connection is terminated when the associated individual personal computing device is outside of the geofence.

7. The computer-implemented method according to claim 6, further comprising:
deleting data in a cache of the associated individual personal computing device generated from utilizing the PP SSID connection when the PP SSID connection is terminated.

8. The computer-implemented method according to claim 6, wherein the expiration is selected from a group consisting of: a time, an amount of usage, and a type of usage.

9. The computer-implemented method according to claim 6, further comprising:
determining whether an indication that the one of the plurality of PP SSID profiles that is expired has been received at the associated individual personal computing device.

10. The computer-implemented method of claim 6, wherein each of the configured Personal-Public (PP) SSID profiles based on the registration information includes:
receiving a location information related to the associated individual personal computing device,
receiving a context information related to the associated individual personal computing device,
performing machine learning based on the location information and the context information to generate a predicted area of usage and a predicted time of usage associated with the associated individual personal computing device,
associating a geofence with each of the one of the plurality of PP SSID profiles is based on the predicted area of usage, and
associating an expiration of the one of the plurality of PP SSID profiles is based on the predicted time of usage.

11. A computer program product comprising a computer readable storage medium having program instructions embodied therewith, the program instructions executable by a processor to cause the processor to perform a method comprising:
connecting one of a plurality of personal computing devices to a wireless access point (WAP) over a publicly advertised Service Set Identifier (SSID);
registering and configuring one of a plurality of Personal Public (PP) SSID profiles for the one of the plurality of personal computing devices;
storing the plurality of PP SSID profiles configured according to registration information provided from the plurality of personal computing devices; and
implementing an individualized PP SSID provisioning of a PP SSID connection for an associated individual personal computing device of the plurality of personal computing devices, the PP SSID connection being customized by using the one of the plurality of PP SSID profiles for each personal computing device to create a single-device, single-use, password-protected, unadvertised, and encrypted networking channel between the associated individual personal computing device and an Internet.

12. The computer program product of claim 11, wherein each of the PP SSID profiles is associated with an expiration, and wherein the PP SSID connection is configured to be terminated according to the expiration.

13. The computer program product of claim 12, wherein the expiration is selected from a group consisting of: a time, an amount of usage, and a type of usage.

14. The computer program product of claim 12, wherein the expiration is based on a location of the associated individual personal computing device and a geofence defined in each of the PP SSID profiles, and wherein the PP SSID connection is terminated when the associated individual personal computing device is outside of the geofence.

15. The computer program product of claim 11, wherein each of the configured Personal-Public (PP) SSID profiles based on the registration information includes:
   receiving a location information related to the associated individual personal computing device,
   receiving a context information related to the associated individual personal computing device,
   performing machine learning based on the location information and the context information to generate a predicted area of usage and a predicted time of usage associated with the associated individual personal computing device,
   associating a geofence with each of the PP SSID profiles is based on the predicted area of usage, and
   associating an expiration of each of the PP SSID profiles is based on the predicted time of usage.

16. A system comprising:
   a hardware processor; and
   a computer-readable storage medium storing program instructions, wherein the processor is configured to execute the program instructions to cause the processor to perform a method comprising:
   connecting one of a plurality of personal computing devices to a wireless access point (WAP) over a publicly advertised Service Set Identifier (SSID);
   registering and configuring one of a plurality of Personal Public (PP) SSID profiles for the one of the personal computing devices;
   storing the plurality of PP SSID profiles configured according to registration information provided from the plurality of personal computing devices; and
   implementing an individualized PP SSID provisioning of a PP SSID connection for an associated individual personal computing device of the plurality of personal computing devices, the PP SSID connection being customized by using the one of the plurality of PP SSID profiles for each personal computing device to create a single-device, single-use, password-protected, unadvertised, and encrypted networking channel between the associated individual personal computing device and an Internet.

17. The system of claim 16, wherein each of the PP SSID profiles is associated with an expiration, and wherein the PP SSID connection is configured to be terminated according to the expiration.

18. The system of claim 17, wherein the expiration is selected from a group consisting of: a time, an amount of usage, and a type of usage.

19. The system of claim 17, wherein the expiration is based on a location of the associated individual personal computing device and a geofence defined in each of the PP SSID profiles, and wherein the PP SSID connection is terminated when the associated individual personal computing device is outside of the geofence.

20. The system of claim 17, wherein the configured Personal-Public (PP) SSID profile based on the registration information includes:
   a location information related to the associated individual personal computing device,
   a context information related to the associated individual personal computing device,
   a machine learning based on the location information and the context information to generate a predicted area of usage and a predicted time of usage associated with the associated individual personal computing device,
   an associated geofence with the PP SSID profile based on the predicted area of usage, and
   an associated expiration of the PP SSID profile based on the predicted time of usage.

\* \* \* \* \*